(12) United States Patent
Suzuki et al.

(10) Patent No.: US 11,041,832 B2
(45) Date of Patent: Jun. 22, 2021

(54) ULTRASONIC DEVICE AND ELECTRONIC APPARATUS

(71) Applicant: Seiko Epson Corporation, Tokyo (JP)

(72) Inventors: Hironori Suzuki, Chino (JP); Chikara Kojima, Matsumoto (JP)

(73) Assignee: Seiko Epson Corporation

( * ) Notice: Subject to any disclaimer, the term of this patent is extended or adjusted under 35 U.S.C. 154(b) by 104 days.

(21) Appl. No.: 16/431,783

(22) Filed: Jun. 5, 2019

(65) Prior Publication Data

US 2019/0376932 A1 Dec. 12, 2019

(30) Foreign Application Priority Data

Jun. 6, 2018 (JP) .............................. JP2018-108366

(51) Int. Cl.
*G01N 29/32* (2006.01)
*B65H 7/12* (2006.01)

(52) U.S. Cl.
CPC .............. *G01N 29/32* (2013.01); *B65H 7/125* (2013.01)

(58) Field of Classification Search
CPC ................................ G01N 29/32; B65H 7/125
See application file for complete search history.

(56) References Cited

U.S. PATENT DOCUMENTS

| | | | | |
|---|---|---|---|---|
| 5,166,573 | A * | 11/1992 | Brown | B06B 1/0688 310/330 |
| 8,931,777 | B2 * | 1/2015 | Okitsu | B65H 7/125 271/262 |
| 2003/0073906 | A1 * | 4/2003 | Flesch | A61B 8/4494 600/459 |
| 2005/0127597 | A1 * | 6/2005 | Sano | B65H 7/125 271/258.01 |
| 2006/0238067 | A1 * | 10/2006 | Dausch | B06B 1/0622 310/311 |
| 2008/0203654 | A1 * | 8/2008 | Chujo | B65H 7/12 271/262 |
| 2009/0156940 | A1 * | 6/2009 | Yen | G10K 11/004 600/459 |
| 2010/0202253 | A1 * | 8/2010 | Nakamura | G06F 3/0445 367/155 |
| 2012/0172721 | A1 * | 7/2012 | Curra | G01S 15/8913 600/439 |
| 2014/0086017 | A1 * | 3/2014 | Nakano | G01F 1/662 367/180 |
| 2014/0307528 | A1 * | 10/2014 | Dekker | B06B 1/0292 367/178 |
| 2015/0115773 | A1 * | 4/2015 | Li | A61B 8/12 310/335 |
| 2015/0143919 | A1 * | 5/2015 | Nakano | G01F 1/662 73/861.28 |

(Continued)

FOREIGN PATENT DOCUMENTS

JP 2007-037006 A 2/2007

*Primary Examiner* — Helen C Kwok
(74) *Attorney, Agent, or Firm* — Harness, Dickey & Pierce, P.L.C.

(57) ABSTRACT

An ultrasonic device has a substrate in which ultrasonic elements transmitting an ultrasonic wave in a first direction are arrayed. A reverberation reduction film which reduces reverberant vibration of the substrate is arranged on a side of the first direction in the ultrasonic element. In the reverberation reduction film, a groove is arranged between the ultrasonic elements next to each other.

6 Claims, 15 Drawing Sheets

(56) References Cited

U.S. PATENT DOCUMENTS

2016/0030004 A1* 2/2016 Nakazawa ........... A61B 8/4488
                                                      600/447
2019/0129018 A1* 5/2019 Osawa ................ H01L 41/1132
2020/0152857 A1* 5/2020 Ohashi .................... G01S 3/808

* cited by examiner

ULTRASONIC DEVICE AND ELECTRONIC APPARATUS

The present application is based on, and claims priority from, JP Application Serial Number 2018-108366, filed Jun. 6, 2018, the disclosure of which is hereby incorporated by reference herein in its entirety.

BACKGROUND

1. Technical Field

The present disclosure relates to an ultrasonic device and an electronic apparatus.

2. Related Art

An ultrasonic device which measures the distance to a measurement target object is in practical use. The ultrasonic device transmits an ultrasonic wave and receives a reflected wave. Also, a device which emits an ultrasonic wave from an ultrasonic device and measures the number of sheet media, using the intensity of the ultrasonic wave passing through sheet media, is in practical use. JP-A-2007-37006 discloses the ultrasonic device used in these devices. According to JP-A-2007-37006, the ultrasonic device uses an SOI (silicon-on-insulator) substrate. The SOI substrate has a recess formed in a part thereof and thus is thinner at this recess part. An ultrasonic element is arranged on this thinner part. This thinner part is referred to as a vibrating film or membrane.

The ultrasonic element has a structure including a piezoelectric thin film held by electrodes. The ultrasonic element of this structure can be used to both transmit and receive an ultrasonic wave. When the ultrasonic element transmits an ultrasonic wave, a voltage applied between the electrodes causes the piezoelectric thin film to flex. A predetermined voltage waveform is applied between the electrodes. At this time, the membrane vibrates. When the application of the voltage between the electrodes is stopped, the vibration of the membrane is damped and stops. With the damping of the vibration of the membrane, the transmitted ultrasonic wave is damped. A thin damper/absorber film is placed, covering the ultrasonic element. The damper/absorber film can absorb the vibration of the membrane and thus restrains reverberant vibration. Since the vibration of the membrane is thus damped in a short time, the transmitted ultrasonic wave is damped in a short time.

When the ultrasonic element receives an ultrasonic wave, the ultrasonic wave causes the membrane to vibrate. Then, the piezoelectric thin film flexes. At this time, a voltage is generated between the electrodes. Detecting the voltage between the electrodes enables recognition that the ultrasonic element has received the ultrasonic wave. At this time, the damper/absorber film restrains reverberant vibration. Therefore, the ultrasonic device can convert the ultrasonic wave into an electrical signal highly responsively.

In the ultrasonic device of JP-A-2007-37006, a reverberation reduction film as a damper/absorber film is placed, covering the ultrasonic element. Ina structure where a plurality of ultrasonic elements is arranged, an ultrasonic wave propagates through the damper/absorber film. At this time, the ultrasonic element is influenced by the ultrasonic wave propagating through the damper/absorber film. The ultrasonic element transmits an ultrasonic wave. At this time, the ultrasonic wave transmitted from the ultrasonic element and the ultrasonic wave propagating through the damper/absorber film interfere with each other. The interference of the ultrasonic waves lowers the intensity of the ultrasonic wave transmitted from the ultrasonic element. The ultrasonic element also receives an ultrasonic wave. At this time, the ultrasonic wave received by the ultrasonic element and the ultrasonic wave propagating through the damper/absorber film interfere with each other. The interference of the ultrasonic waves lowers the intensity of the ultrasonic wave received by the ultrasonic element. Thus, there is a demand for an ultrasonic device which reduces the propagation of an ultrasonic wave along the damper/absorber film absorbing the vibration of the membrane and which can transmit or receive an ultrasonic wave with high quality even when ultrasonic elements are arrayed.

SUMMARY

An ultrasonic device according to an aspect of the disclosure includes a substrate in which ultrasonic elements transmitting an ultrasonic wave in a first direction are arrayed. A reverberation reduction film which reduces reverberant vibration of the substrate is arranged on a side of the first direction in the ultrasonic element. In the reverberation reduction film, a groove is arranged between the ultrasonic elements next to each other.

In the ultrasonic device, a material of the reverberation reduction film may include silicone rubber.

In the ultrasonic device, a recess may be arranged in the reverberation reduction film at a position facing the ultrasonic element.

An electronic apparatus according to another aspect of the disclosure includes a multi-feed detection device which is installed in a transport path of a medium and which detects whether two or more of the media are superimposed on each other or not. The multi-feed detection device has the foregoing ultrasonic device.

An electronic apparatus according to still another aspect of the disclosure includes an ultrasonic transmitter which transmits an ultrasonic wave, and an ultrasonic receiver which receives the ultrasonic wave transmitted from the ultrasonic transmitter. The ultrasonic transmitter has the foregoing ultrasonic device.

An ultrasonic device according to still another aspect of the disclosure includes a substrate in which ultrasonic elements receiving an ultrasonic wave traveling from a first direction are arrayed. A reverberation reduction film which reduces reverberant vibration of the substrate is arranged on a side of the first direction in the ultrasonic element. In the reverberation reduction film, a groove is arranged between the ultrasonic elements next to each other.

DESCRIPTION OF EXEMPLARY EMBODIMENTS

Figure 1:
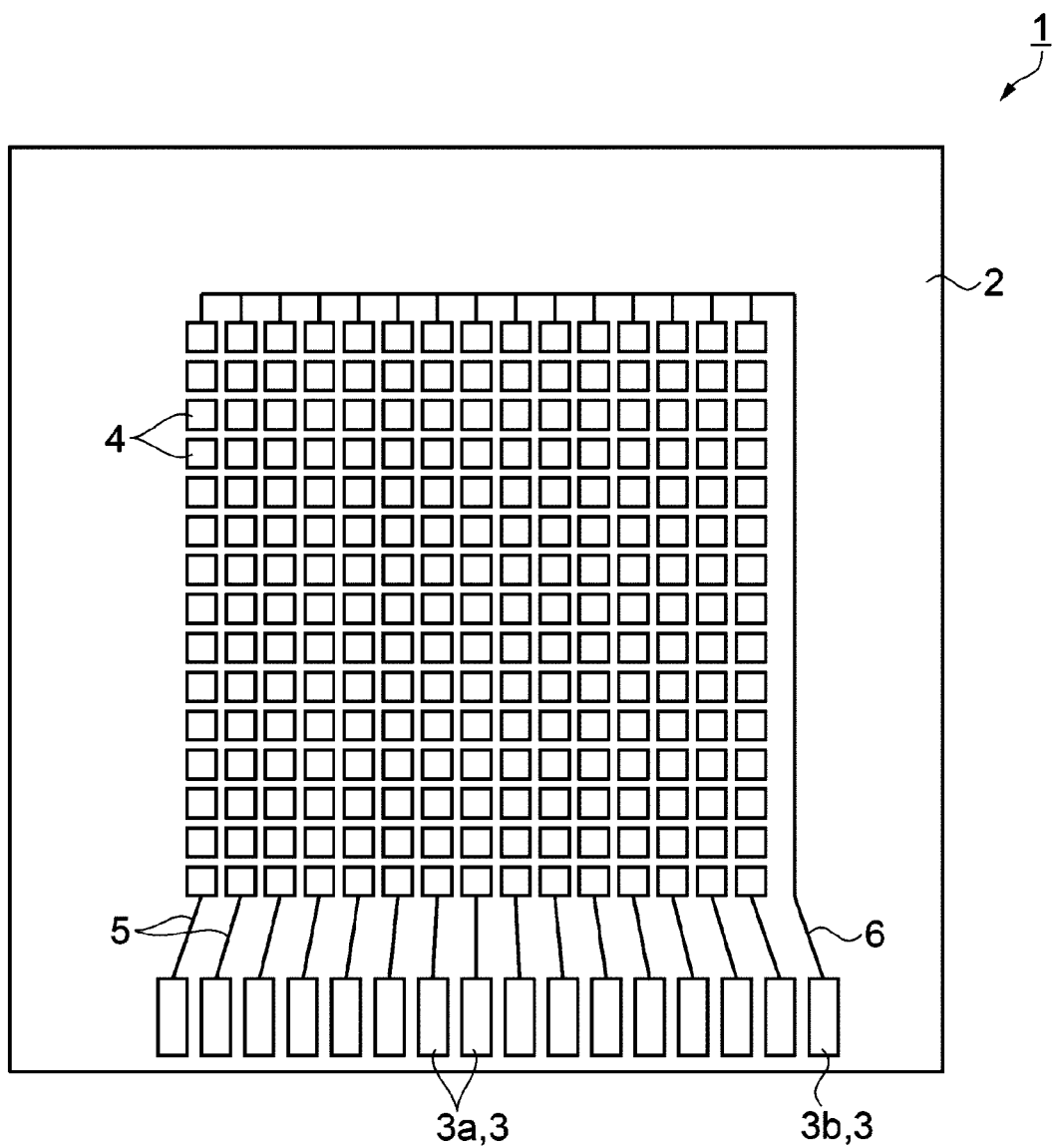
FIG. 1 is a schematic plan view showing the structure of an ultrasonic device according to a first embodiment.
Figure 1:
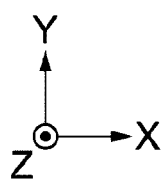

Embodiments will now be described with reference to the drawings.

In the drawings, components are illustrated with different scales from each other so that the components are in a recognizable size in the drawings.

First Embodiment

In this embodiment, a characteristic example of an ultrasonic device and an example of a method for manufacturing the ultrasonic device are described with reference to the drawings. An ultrasonic device according to a first embodiment is described with reference to FIGS. 1 to 5. The ultrasonic device is a device also referred to as an ultrasonic transducer device.

FIG. 1 is a schematic plan view showing the structure of the ultrasonic device. As shown in FIG. 1, an ultrasonic device 1 has a substrate 2. The substrate 2 is rectangular, with two adjacent sides being orthogonal to each other. An axis along which one side extends is defined as an X-axis. An axis along which one side adjacent to the side on the X-axis extends is defined as a Y-axis. An axis along the thickness of the substrate 2 is defined as a Z-axis. On the −Y side on the substrate 2, external terminals 3 are placed, arrayed along the X-axis.

On the +Y side from the external terminals 3, a plurality of ultrasonic elements 4 arrayed in the form of a matrix is arranged on the substrate 2. The numbers of rows and columns of the ultrasonic elements 4 are not particularly limited. When the ultrasonic device 1 is used as a sensor, the number of rows may be 10 to 100 and the number of columns may be 10 to 100. This provides an ultrasonic wave with an intensity that can be detected with high sensitivity. In this embodiment, to facilitate understanding, it is assumed, for example, that the ultrasonic elements 4 are arranged in 15 rows by 15 columns.

Of the external terminals 3, the first to $15^{th}$ external terminals 3 from the −X side are signal terminals 3a. The ultrasonic element 4 and the signal terminal 3a in each column are electrically coupled together by a signal wiring 5. Of the external terminals 3, the terminal that is the farthest into the +X direction is a common terminal 3b. On the +X side of the respective ultrasonic elements 4, a first common wiring 6 extending in the +Y direction from the common terminal 3b is placed. The first common wiring 6 is a wiring extending along the X-axis on the +Y side of the ultrasonic elements 4. The first common wiring 6 is branched at a part on the +Y side of the ultrasonic elements 4 and electrically coupled to the ultrasonic elements 4. The ultrasonic elements 4 are coupled to the common terminal 3b via the first common wiring 6.

Figure 2:
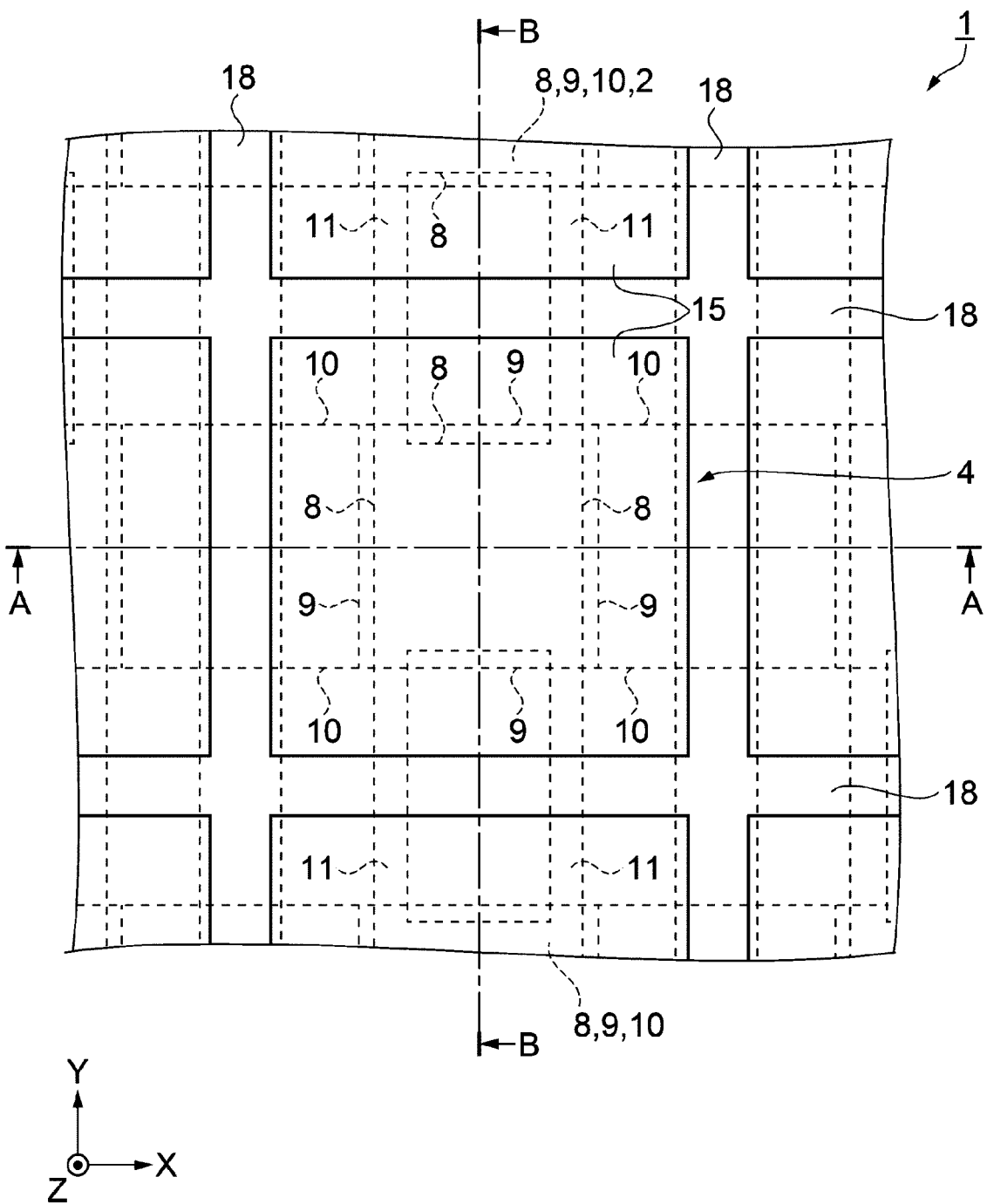
FIG. 2 is a schematic plan view showing an essential part of the configuration of an ultrasonic element.
Figure 3:
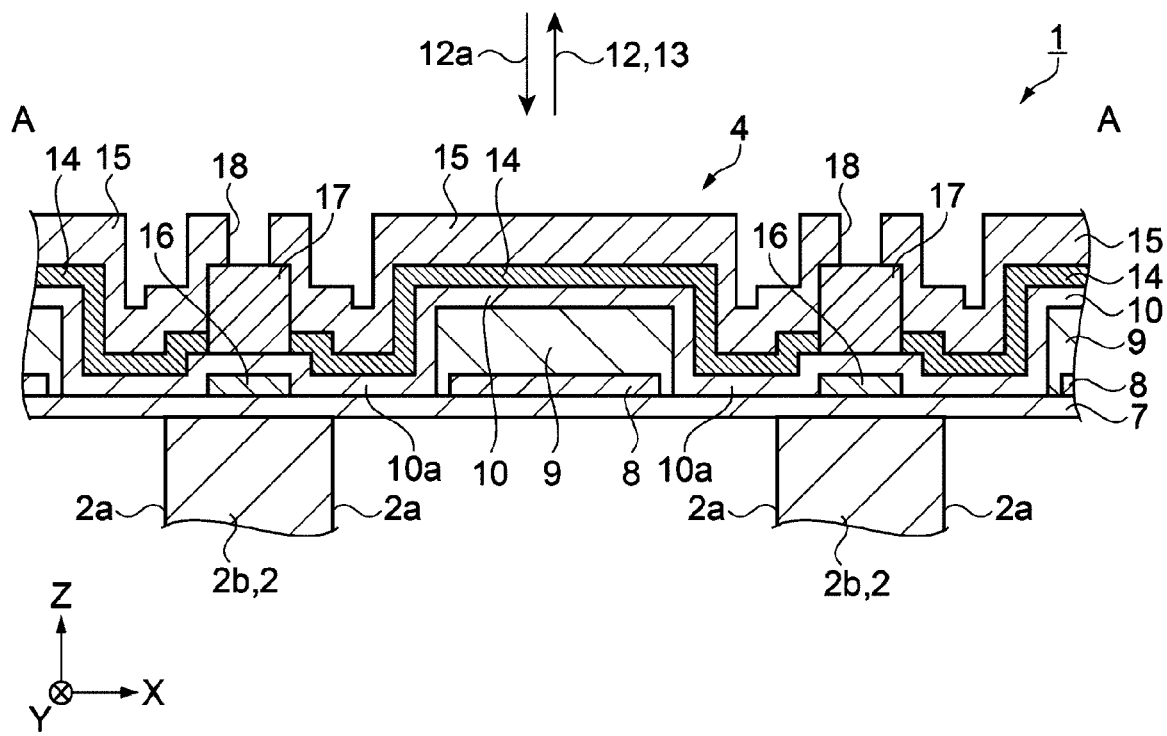
FIG. 3 is a schematic side cross-sectional view showing an essential part of the configuration of the ultrasonic element.
Figure 4:
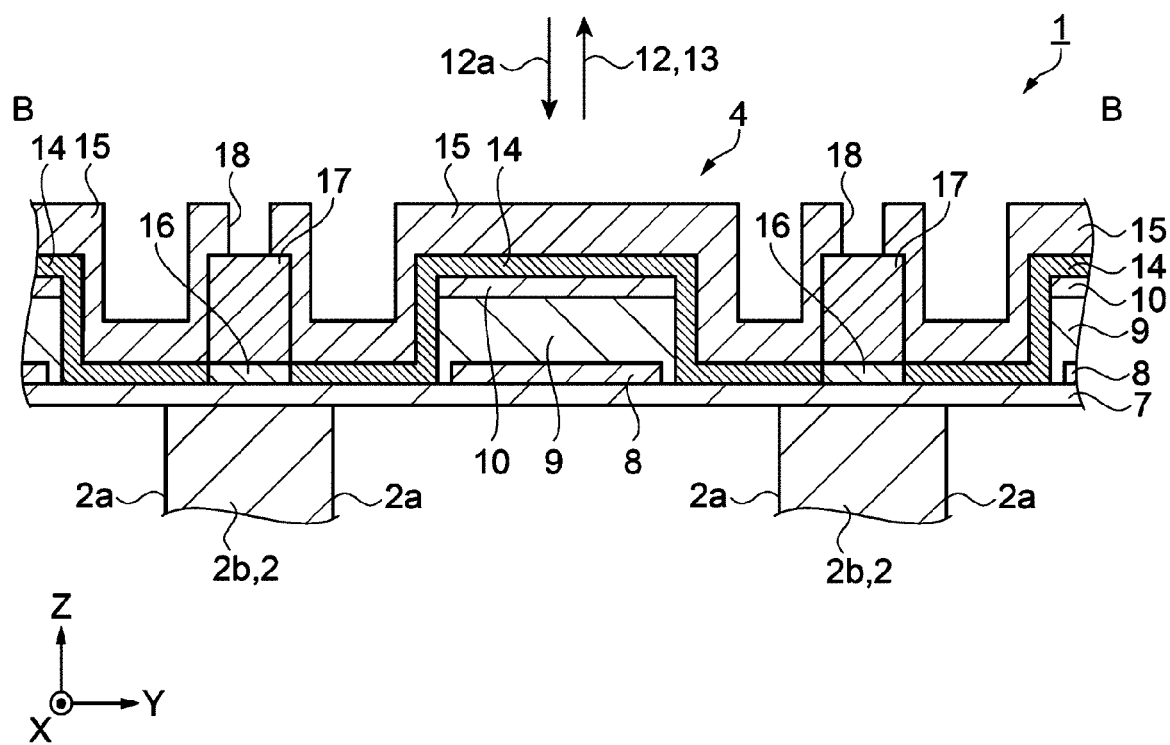
FIG. 4 is a schematic side cross-sectional view showing an essential part of the configuration of the ultrasonic element.

FIG. 2 is a schematic plan view showing an essential part of the configuration of the ultrasonic element. FIGS. 3 and 4 are schematic side cross-sectional views showing an essential part of the configuration of the ultrasonic element. FIG. 3 shows a cross section taken along A-A in FIG. 2. FIG. 4 shows a cross section taken along B-B in FIG. 2. As shown in FIGS. 2, 3, and 4, a recess 2a is formed in the substrate 2 at a position facing the ultrasonic element 4. The recess 2a is arranged in the form of a matrix similar to the ultrasonic element 4. The size of the recess 2a is not particularly limited. In this embodiment, for example, the recess 2a is a square with one side being 150 μm to 250 μm long. A part between recesses 2a next to each other along the X-axis and the Y-axis is defined as a beam 2b. The beam 2b has a part extending along the X-axis and a part extending along the Y-axis, which are orthogonal to each other. The material of the substrate 2 is not particularly limited and may be any material that has certain strength and can be finely processed. In this embodiment, for example, a silicon substrate is used as the substrate 2.

On the +Z side of the substrate 2, a vibrating film 7 is placed in contact with the substrate 2 and forms a part of the substrate 2. In the recess 2a, the vibrating film 7 can easily vibrate. The material of the vibrating film 7 is not particularly limited, provided that it has a good vibration property. The vibrating film 7 may also be insulative. In this embodiment, for example, silicon dioxide or zirconium dioxide is used as the material of the vibrating film 7. When the vibrating film 7 is not insulative, an insulating film may be placed on the vibrating film 7. The vibrating film 7 is also referred to as a membrane.

On the vibrating film 7, a lower electrode 8, a piezoelectric member 9, and an upper electrode 10 are stacked and placed. The lower electrode 8, the piezoelectric member 9, and the upper electrode 10 form the ultrasonic element 4. A drive voltage is applied between the lower electrode 8 and the upper electrode 10. The drive voltage causes the piezoelectric member 9 to flex. The ultrasonic element 4 transmits an ultrasonic wave 12 in a direction along the Z-axis in the illustration. The direction along the Z-axis in which the ultrasonic element 4 transmits the ultrasonic wave 12 is defined as a first direction 13. On the substrate 2, the ultrasonic elements 4 transmitting the ultrasonic wave 12 in the first direction 13 are arrayed. The ultrasonic elements 4 arrayed on the substrate 2 can also receive an ultrasonic wave 12a traveling from the first direction 13. The lower electrode 8 is covered with the piezoelectric member 9. The lower electrodes 8 arrayed along the Y-axis are coupled together by a wiring 11 shown in FIG. 2. The wiring 11 is electrically coupled to the signal terminal 3a via the signal wiring 5.

The type of the piezoelectric member 9 is not particularly limited. A piezoelectric member such as a PZT (lead zirconate titanate) element or PDVF (polyvinylidene fluoride) element can be used. In this embodiment, a PZT element is used as the piezoelectric member 9. The material of the lower electrode 8 and the upper electrode 10 may be any material that is electrically conductive and stable. In this embodiment, for example, a film made up of an iridium film and a platinum film stacked on each other is used. The PZT element can be stably formed on the platinum film.

A protection film 14 is arranged on the +Z side of the upper electrode 10, in the ultrasonic element 4. The protection film 14 covers a part of the piezoelectric member 9, the lower electrode 8, and the upper electrode 10. The protection film 14 prevents moisture from entering the piezoelectric member 9 and prevents a leak between wirings due to dust. As the material of the protection film 14, an insulating film of an inorganic substance such as silicon oxide or aluminum oxide is used. In this embodiment, for example, aluminum oxide is employed as the material of the inorganic insulating film, which is the protection film 14.

A reverberation reduction film 15 which reduces reverberant vibration of the substrate 2 is arranged on the side in the first direction 13 in the ultrasonic element 4. The reverberation reduction film 15 is superimposed on the protection film 14. The reverberation reduction film 15 reduces reverberation of the vibration of the substrate 2 including the vibrating film 7. The material of the reverberation reduction film 15 includes silicone rubber. Since silicone rubber has a low Young's modulus, the reverberation reduction film 15 can reduce reverberant vibration without obstructing the movement of the substrate 2 including the vibrating film 7 and of the ultrasonic element 4.

A burst waveform is used as the drive voltage. In the burst waveform, a section where a rectangular waveform repeats and a DC waveform section are alternately combined. In the section where a rectangular waveform repeats, the ultrasonic element 4 vibrates. In the DC waveform section, the vibration of the ultrasonic element 4 is damped. When the vibration of the ultrasonic element 4 remains in the DC waveform section, the remaining vibration and vibration generated in the next drive waveform, where a rectangular waveform repeats, are combined together. When the remaining vibration and the vibration driven in the repetitive rectangular waveform have different phases from each other, the intensity of the vibration drops.

In the DC waveform section, the reverberation reduction film 15 reduces the vibration of the ultrasonic element 4. Therefore, the drop in the intensity of the vibration driven in the rectangular waveform due to the remaining vibration can be reduced.

The ultrasonic element 4 receives the ultrasonic wave 12a and vibrates. In this case, too, when the vibration is not damped after the ultrasonic element 4 receives the ultrasonic wave 12a and vibrates, this vibration is combined with vibration generated on reception after a predetermined time. In this case, too, when the remaining vibration and the vibration generated on reception have different phases from each other, the intensity of the vibration drops. In the section where the ultrasonic wave 12a is not received, the reverberation reduction film 15 reduces the vibration of the ultrasonic element 4. Therefore, the reverberation reduction film 15 can restrain the remaining vibration from lowering the intensity of the vibration based on the received ultrasonic wave 12a.

As shown in FIG. 3, a wiring 16 is superimposed on the vibrating film 7 on the +Z side of the beam 2b on the +X side and the −X side in the ultrasonic element 4. The wiring 16 is a wiring extending along the Y-axis. The wiring 16 is made of the same material as the lower electrode 8. The wiring 16 is formed in the same process as the lower electrode 8 but is electrically separated from the lower electrode 8.

A wiring 10a is superimposed on the wiring 16. The wiring 10a electrically couples together the upper electrodes 10 next to each other along the X-axis. Also, a second common wiring 17 is superimposed on the wiring 10a. The second common wiring 17 is a wiring extending along the Y-axis. The wiring 10a is arranged between the wiring 16 and the second common wiring 17. The wiring 10a electrically couples together the wiring 16 and the second common wiring 17, and the upper electrode 10. The wiring 10a is made of the same material as the upper electrode 10. The wiring 16 and the second common wiring 17 are electrically coupled to the common terminal 3b via the first common wiring 6. The wiring 16 transmits an electrical signal together with the second common wiring 17. Therefore, the wiring 16 reduces electrical resistance, compared with when only the second common wiring 17 is arranged.

The reverberation reduction film 15 is arranged on the +Z side of the second common wiring 17. The reverberation reduction film 15 continues from the ultrasonic element 4. In the reverberation reduction film 15, a groove 18 is arranged between the ultrasonic elements 4 next to each other. At the position where the groove 18 is arranged, the thickness of the reverberation reduction film 15 is reduced. Alternatively, at the position where the groove 18 is arranged, the reverberation reduction film 15 is absent.

As shown in FIG. 4, the wiring 16 is superimposed on the vibrating film 7 on the +Z side of the beam 2b on the +Y side and the −Y side in the ultrasonic element 4. The wiring 16 is a wiring extending along the X-axis. Similarly to the beam 2b, the wiring 16 has a part extending along the X-axis and a part extending along the Y-axis, which are orthogonal to each other.

The second common wiring 17 is superimposed on the wiring 16. The second common wiring 17 is a wiring extending along the X-axis. Similarly to the wiring 16, the second common wiring 17 has a part extending along the X-axis and a part extending along the Y-axis, which are orthogonal to each other. Along the Y-axis, too, the wiring 16 transmits an electrical signal together with the second common wiring 17. Therefore, the wiring 16 reduces electrical resistance, compared with when only the second common wiring 17 is arranged.

Along the Y-axis, too, the reverberation reduction film 15 continues from the ultrasonic element 4. In the reverberation reduction film 15, the groove 18 is arranged between the ultrasonic elements 4 next to each other. At the position where the groove 18 is arranged, the thickness of the reverberation reduction film 15 is reduced. Alternatively, at the position where the groove 18 is arranged, the reverberation reduction film 15 is absent.

As shown in FIG. 2, the reverberation reduction film 15 is quadrilateral, as viewed in a plan view on the Z-axis. In the reverberation reduction film 15, the groove 18 is arranged between the ultrasonic elements 4 next to each other, also along the X-axis and the Y-axis.

Figure 5:
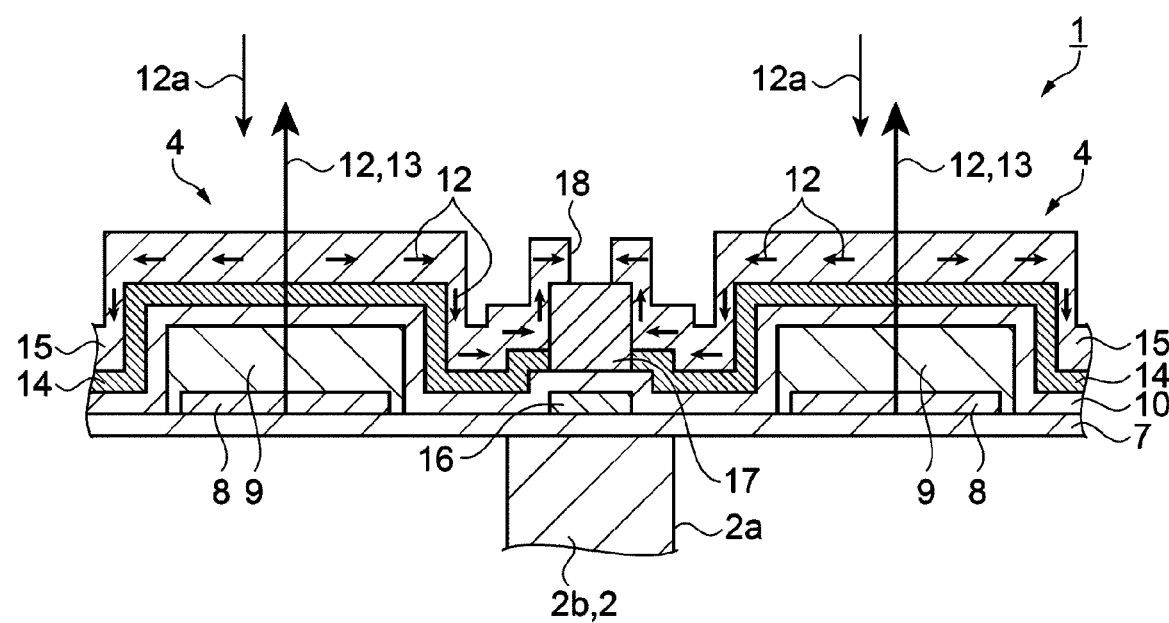
FIG. 5 is a schematic view for explaining an ultrasonic wave propagating through a reverberation reduction film.

FIG. 5 is a schematic view for explaining an ultrasonic wave propagating through the reverberation reduction film. As shown in FIG. 5, the ultrasonic wave 12 is transmitted into the first direction 13 from the ultrasonic element 4. A part of the ultrasonic wave 12 transmitted from the ultrasonic element 4 travels in a direction intersecting the first direction 13. At this time, apart of the ultrasonic wave 12 propagates and travels through the reverberation reduction film 15. The ultrasonic wave 12 then reaches the groove 18. In the groove 18, air is present and therefore the refractive index is very different from that in the reverberation reduction film 15. That is, the propagation speed of the ultrasonic wave 12 differs between the reverberation reduction film 15 and the air.

Thus, a part of the ultrasonic wave 12 is reflected off the groove 18 and changes direction. A part of the ultrasonic wave 12 travels into the air from the reverberation reduction film 15 and travels in various directions in the air. Therefore, the ultrasonic wave 12 does not easily reach the ultrasonic element 4 next to the ultrasonic element 4 transmitting the ultrasonic wave 12. Accordingly, the ultrasonic element 4 is not easily influenced by the ultrasonic wave 12 transmitted from the next ultrasonic element 4. Thus, the ultrasonic wave 12 can be transmitted with high quality even when the ultrasonic elements 4 are arrayed.

The illustration explains the behavior of the ultrasonic wave 12 traveling along the X-axis in the reverberation reduction film 15. Also, a part of the ultrasonic wave 12 traveling along the Y-axis in the reverberation reduction film 15 is reflected off the groove 18. Apart of the ultrasonic wave 12 travels into the air from the reverberation reduction film 15 and travels in various directions in the air. Therefore, the ultrasonic wave 12 does not easily reach the ultrasonic element 4 next to the ultrasonic element 4 transmitting the ultrasonic wave 12. Accordingly, the ultrasonic element 4 is not easily influenced by the ultrasonic wave 12 transmitted from the next ultrasonic element 4. Thus, the ultrasonic wave 12 can be transmitted with high quality even when the ultrasonic elements 4 are arrayed.

Also, when the ultrasonic element 4 receives the ultrasonic wave 12*a*, apart of the ultrasonic wave 12*a* reaching the reverberation reduction film 15 travels through the reverberation reduction film 15. At this time, a part of the ultrasonic wave 12*a* is reflected off the groove 18 and changes direction. Apart of the ultrasonic wave 12*a* travels into the air from the reverberation reduction film 15 and travels in various directions in the air. Therefore, the ultrasonic wave 12*a* does not easily reach the ultrasonic element 4 next to the ultrasonic element 4 receiving the ultrasonic wave 12*a*. Accordingly, the ultrasonic element 4 is not easily influenced by the ultrasonic wave 12*a* received by the next ultrasonic element 4. Thus, the ultrasonic wave 12*a* can be received with high quality even when the ultrasonic elements 4 are arrayed.

The width of the groove 18 is not particularly limited. However, in this embodiment, the width is, for example, 30 μm or more and 40 μm or less. In this case, the ultrasonic wave 12 propagates through the reverberation reduction film 15 but is restrained from reaching the next ultrasonic element 4. This narrow width of the groove 18 can restrain an increase in the area of the ultrasonic device 1.

Figure 6:
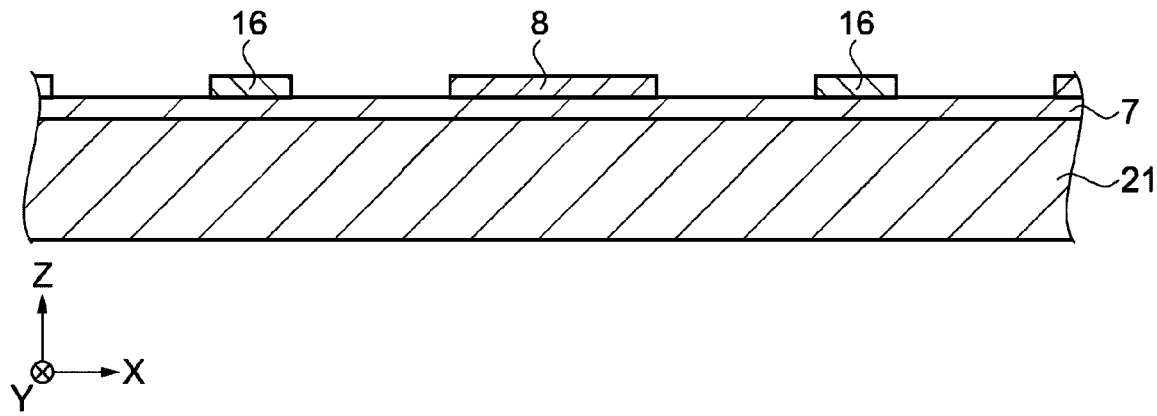
FIG. 6 is a schematic view for explaining a method for manufacturing the ultrasonic device.

FIGS. 6 to 15 are schematic views for explaining a method for manufacturing the ultrasonic device. The method for manufacturing the ultrasonic device 1 will now be described with reference to FIGS. 6 to 15. FIG. 6 is a schematic view for explaining a vibrating plate placement process. As shown in FIG. 6, a base plate 21 is prepared. The base plate 21 is a silicon substrate. Then, a layer to be the vibrating film 7 is placed on the base plate 21. First, a silicon oxide layer ($SiO_2$) is stacked on the surface of the base plate 21, and a zirconium dioxide layer ($ZrO_2$) is stacked on the surface of the silicon oxide layer. To stack the materials, a method such as sputtering or CVD (chemical vapor deposition) is used.

The lower electrode 8 and the wiring 16 are placed on the vibrating film 7. First, a metal film is placed on the vibrating film 7. In this embodiment, for example, the metal film is a layer made up of platinum stacked on iridium oxide. The method for placing the metal film is not particularly limited. However, in this embodiment, sputtering is used for the placement.

Next, a photosensitive resist is placed on the metal film, then masks in the shapes of the lower electrode 8 and the wiring 16 are superimposed thereon, and these are exposed to light. Subsequently, the photosensitive resist is removed by etching. Also, the metal film masked with a resist is etched and the resist is subsequently removed. As a result, the lower electrode 8 and the wiring 16 are placed on the vibrating film 7.

Figure 7:
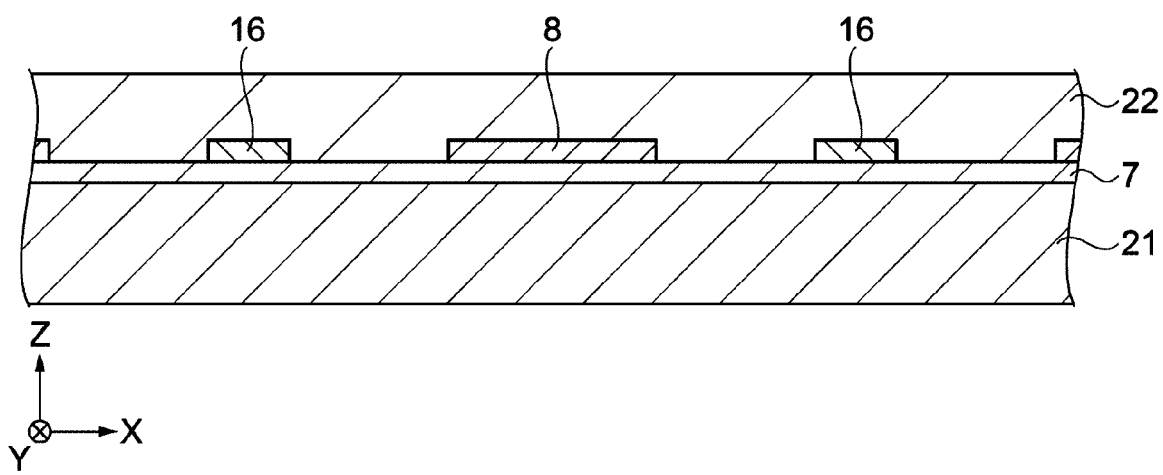
FIG. 7 is a schematic view for explaining the method for manufacturing the ultrasonic device.
Figure 8:
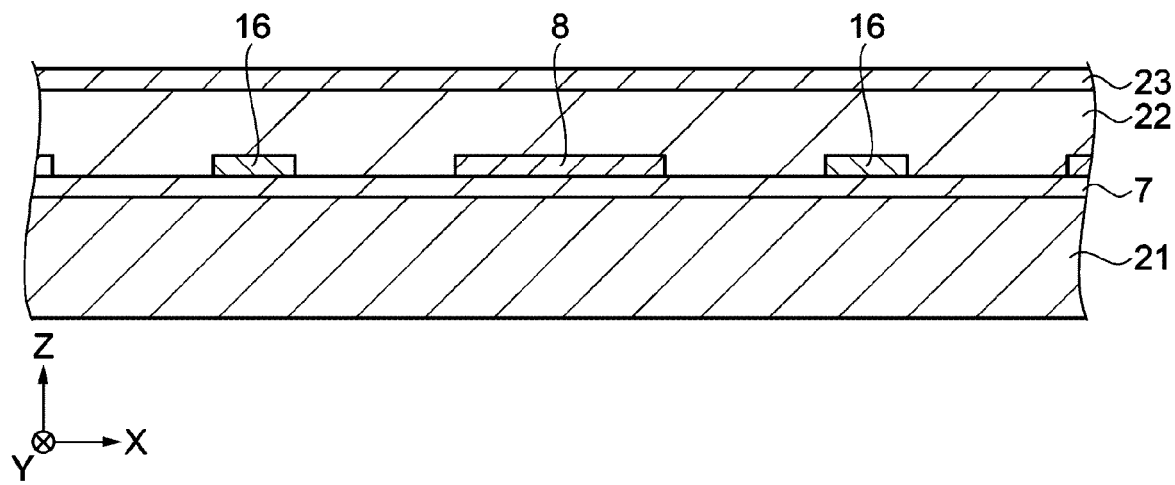
FIG. 8 is a schematic view for explaining the method for manufacturing the ultrasonic device.
Figure 9:
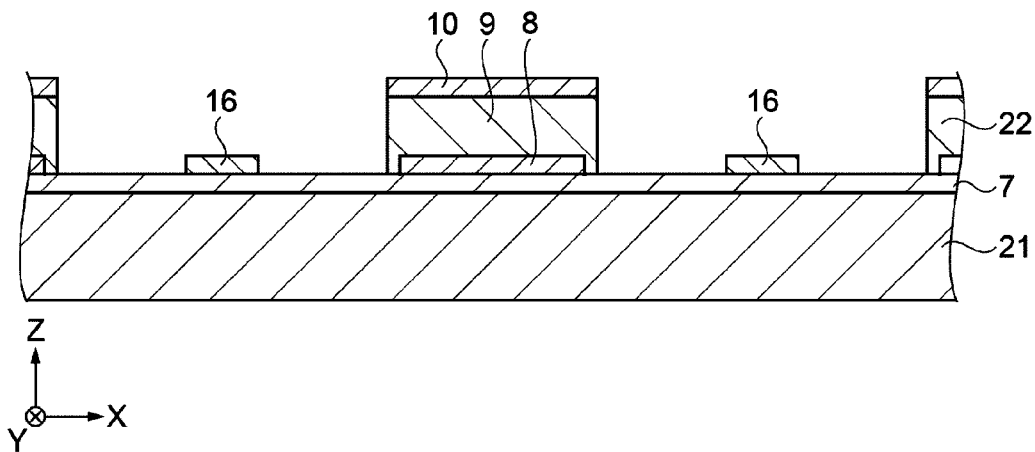
FIG. 9 is a schematic view for explaining the method for manufacturing the ultrasonic device.

FIGS. 7 to 9 are schematic views for explaining a piezoelectric member placement process. As shown in FIG. 7, a pyroelectric material layer 22 is placed. The pyroelectric material layer 22 is a layer to be the material of the piezoelectric member 9 and is a PZT film layer. The pyroelectric material layer 22 is placed, using a sputtering method or a sol-gel method. In the sputtering method, sintered PZT of a specific component is used as a sputtering target, and an amorphous piezoelectric precursor film is formed on the vibrating film 7 by sputtering.

Next, this amorphous piezoelectric precursor film is heated and crystallized, and thus sintered. The heating is carried out, for example, in an oxygen atmosphere such as oxygen or a mixed gas of oxygen and an inert gas like argon. In the heating process, the piezoelectric precursor film is heated at a temperature of 500 to 700° C. in the oxygen atmosphere. The heating crystallizes the piezoelectric precursor film.

In the sol-gel method, a sol is prepared, which is a hydrated complex of a hydroxide of titanium, zirconium, lead and the like to be the material of the pyroelectric material layer 22. The sol is dehydrated into a gel. The gel is heated and fired to prepare the pyroelectric material layer 22, which is an inorganic oxide. An alkoxide or acetate of each of titanium, zirconium, lead, and other metal components is used as a starting material. This starting material is the sol. The sol is used as a composition mixed with an organic polymer compound. The organic polymer compound absorbs a residual stress of the pyroelectric material layer 22 at the time of drying and firing and thus reduces the risk of cracking in the pyroelectric material layer 22.

Next, the sol composition is applied onto the vibrating film 7. For the application, various coating methods or printing methods are used. After the application, the film of the sol composition is dried. The drying is air drying or by heating to a temperature of 80° C. or higher and 200° C. or lower. Subsequently, the film of the sol composition is fired.

At a firing temperature within a range of 300 to 450° C., firing is carried out for approximately 10 to 120 minutes. The firing gels the film of the sol composition.

Next, refiring is carried out at a different temperature. At a firing temperature within a range of 400 to 800° C., firing is carried out for approximately 0.1 to 5 hours. In the refiring, a first stage is carried out at a temperature within a range of 400 to 600° C. and then a second stage is carried out at a temperature within a range of 600 to 800° C. This transforms the porous gel thin film into a film made up of a crystalline metal oxide. To form a multilayer film of this film, the processes from the application of the starting material to the firing are repeated. Subsequently, pre-annealing is carried out.

As shown in FIG. 8, an upper metal film 23 is placed. In this embodiment, for example, an iridium film, a titanium film, and an iridium film are stacked in this order as the upper metal film 23. The method for placing the upper metal film 23 is not particularly limited. However, in this embodiment, for example, sputtering is used for the placement.

As shown in FIG. 9, the pyroelectric material layer 22 and the upper metal film 23 are patterned. A film made of a mask film material is placed on the upper metal film 23. Then, exposure and development are carried out using photolithography, and the film made of the mask film material is patterned to form a mask film. Specifically, first, a photosensitive resist film is placed, then a mask in the shape of the piezoelectric member 9 is superimposed thereon, and these are exposed to light. Subsequently, the photosensitive resist is removed by etching and the mask film is placed. The shape of the mask film is the same as the shape of the piezoelectric member 9.

A part of the pyroelectric material layer 22 is removed, using a dry etching method with the mask film serving as a mask. By the dry etching, the pyroelectric material layer and the upper metal film 23 are etched and become quadrilateral. Subsequently, the mask film is stripped off, using a stripping solution.

Also, the upper metal film 23 is patterned. A film made of a mask film material is placed on the upper metal film 23. Then, exposure and development are carried out using photolithography, and the film made of the mask film material is patterned to form a mask film. Subsequently, the resist film is removed by etching and the mask film is placed. The shape of the mask film is the same as the shape of the upper electrode 10.

A part of the upper metal film 23 is removed, using a dry etching method with the mask film serving as a mask. By the dry etching, the upper metal film 23 is etched to have the shape of the upper electrode 10. Subsequently, the mask film is stripped off, using a stripping solution. As a result, the lower electrode 8, the piezoelectric member 9, and the upper electrode 10 are stacked on the vibrating film 7.

Figure 10:
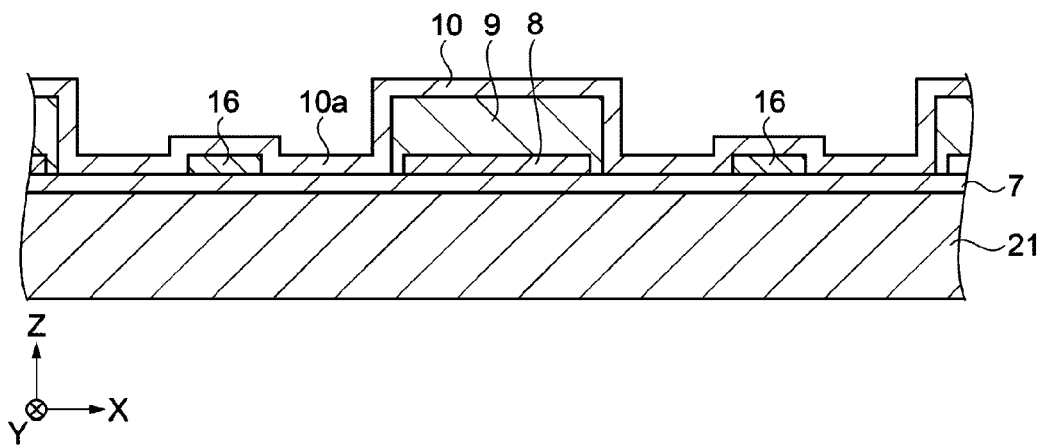
FIG. 10 is a schematic view for explaining the method for manufacturing the ultrasonic device.

FIG. 10 is a schematic view for explaining a wiring placing process. As shown in FIG. 10, the wiring 10a is placed. First, a metal film is formed. The metal film is a film to be the material of the wiring 10a. The method for forming the metal film is not particularly limited. However, in this embodiment, for example, sputtering is used.

Next, a resin film made of a photosensitive material is formed on the metal film. Subsequently, exposure and development are carried out using photolithography, and the resin film is patterned to form a mask film. The shape of the mask film is the same as the shape of the wiring 10a. Next, the metal film is dry-etched with the mask film serving as a mask. As a result, the wiring 10a is formed out of the metal film. Dry etching results in less over-etching in a planar direction than wet etching and therefore can forma fine pattern with high accuracy.

Figure 11:
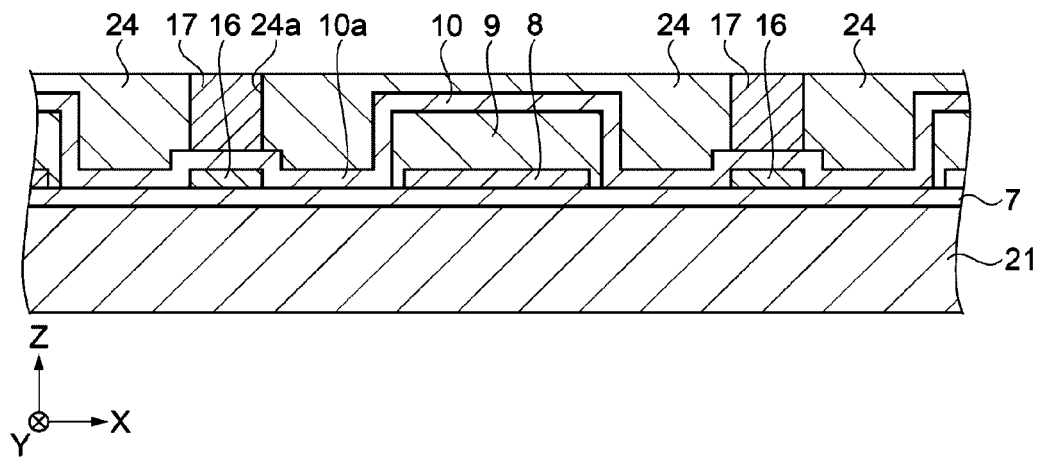
FIG. 11 is a schematic view for explaining the method for manufacturing the ultrasonic device.
Figure 12:
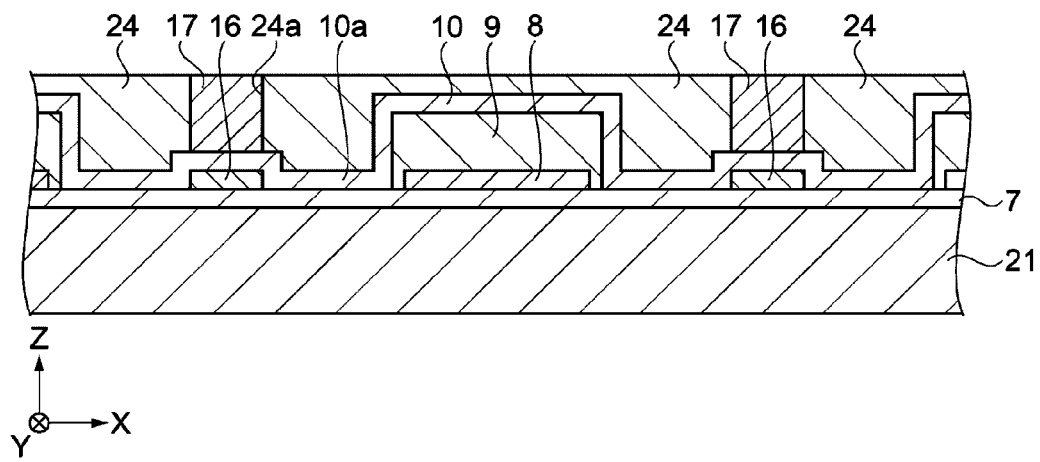
FIG. 12 is a schematic view for explaining the method for manufacturing the ultrasonic device.

FIGS. 11 and 12 are schematic views for explaining a common wiring placement process. As shown in FIG. 11, a photosensitive resin layer 24 is placed. At this time, the thickness of the photosensitive resin layer 24 is adjusted in such a way that the thickness of the photosensitive resin layer 24 on the wiring 10a is the same as the thickness of the second common wiring 17. In this embodiment, for example, a positive photoresist is used as the photosensitive resin layer 24. The thickness of the photosensitive resin layer 24 is, for example, 10 μm. The photosensitive resin layer 24 is exposed and developed, and the photosensitive resin layer 24 at the position to form the second common wiring 17 is removed. Then, a mask pattern to form an opening 24a at the position to form the second common wiring 17 is formed. Next, for example, Cu is deposited on the wiring 10a inside the opening 24a by electroplating, thus forming the second common wiring 17. Subsequently, the photosensitive resin layer 24 is removed, as shown in FIG. 12. For example, a Ni layer or Au layer may be formed on the surface of the second common wiring 17 by electroless plating.

Figure 13:
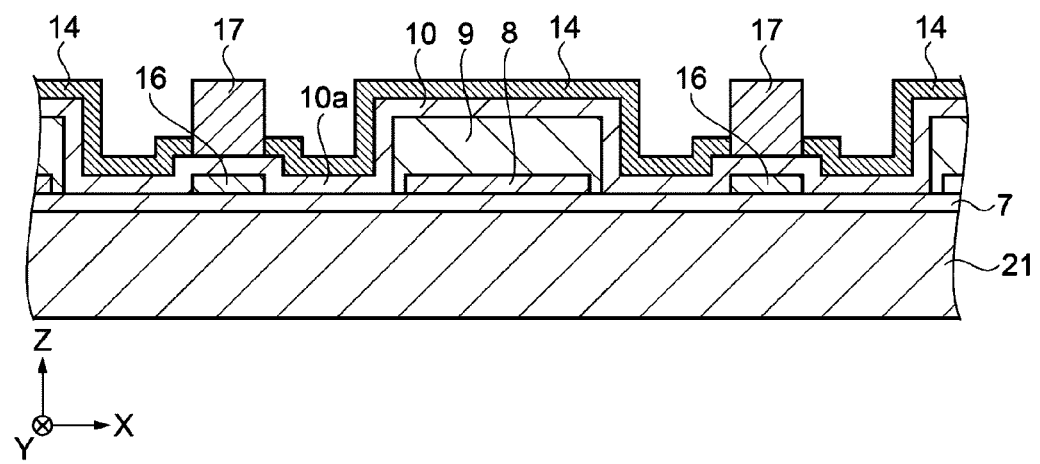
FIG. 13 is a schematic view for explaining the method for manufacturing the ultrasonic device.

FIG. 13 is a schematic view for explaining a protection film placement process. As shown in FIG. 13, the protection film 14 is placed. First, the upper electrode 10, the wiring 10a, and the second common wiring 17 are superimposed on each other to place an inorganic film. The inorganic film is an aluminum oxide ($Al_2O_3$) film and is formed using a CVD method. Next, a resin film made of a photosensitive material is formed. Subsequently, exposure and development are carried out using photolithography, and the resin film is patterned to form a mask film. Next, the inorganic film is dry-etched with the mask film serving as a mask. Subsequently, the mask film is removed. As a result, the inorganic film is formed in the shape of the protection film 14.

Figure 14:
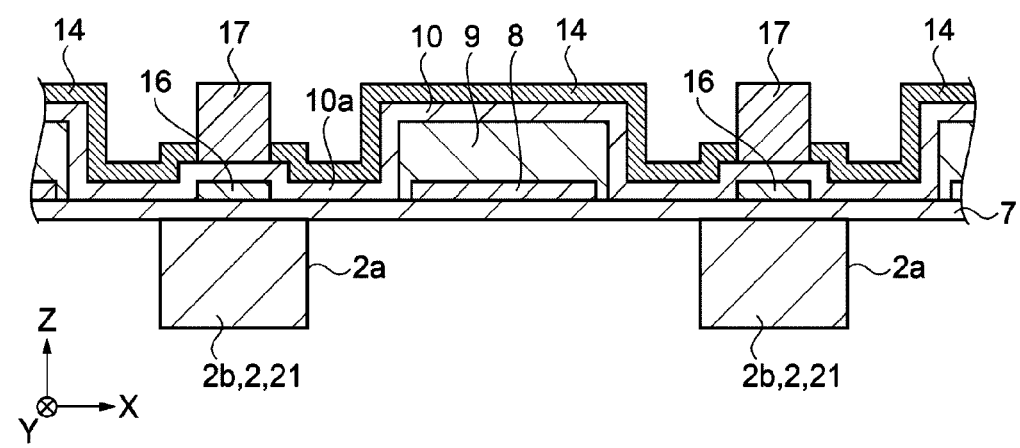
FIG. 14 is a schematic view for explaining the method for manufacturing the ultrasonic device.

FIG. 14 is a schematic view for explaining a recess placement process. As shown in FIG. 14, the base plate 21 is patterned to form the recess 2a. Specifically, a film made of a mask film material is placed on the surface on the −Z side of the base plate 21. Then, exposure and development are carried out using photolithography, and the film made of the mask film material is patterned to form a mask film. The shape of the mask film is the planar shape of the opening of the recess 2a. Next, the base plate 21 is etched with the mask film serving as a mask. The base plate 21 is etched using an etching method such as wet anisotropic etching, or anisotropic etching using an active gas like parallel-plate reactive ion etching. The vibrating film 7 functions as an etching stop layer. Next, the mask film is removed. As a result, the recess 2a is formed in the base plate 21. This process completes the substrate 2.

Figure 15:
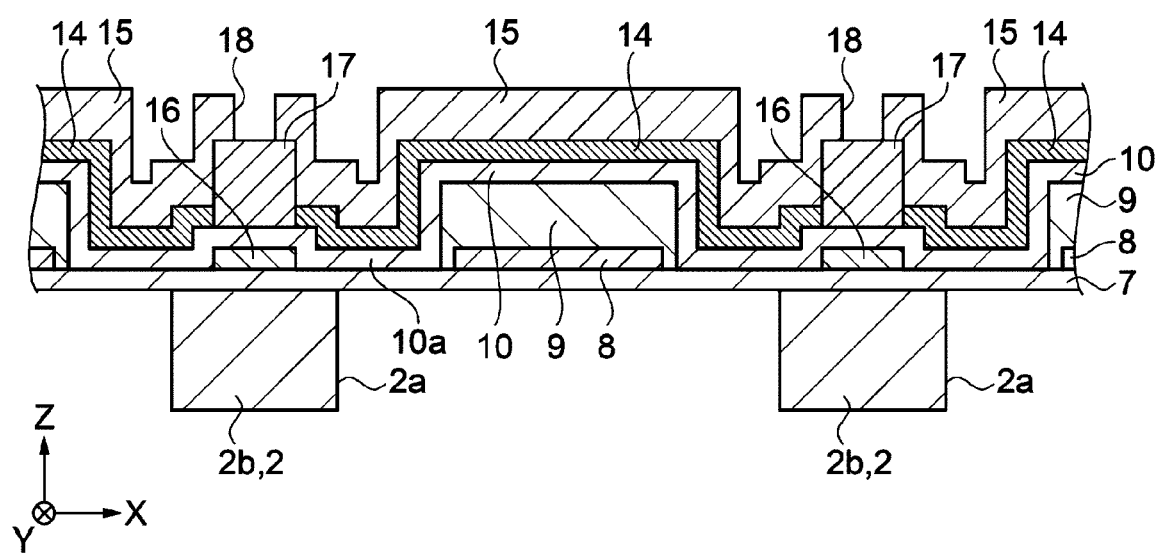
FIG. 15 is a schematic view for explaining the method for manufacturing the ultrasonic device.

FIG. 15 is a schematic view for explaining a reverberation reduction film placement process. As shown in FIG. 15, the reverberation reduction film 15 is superimposed on the protection film 14. First, a solid film of silicone rubber is superimposed on the reverberation reduction film 15. The solid film refers to a planarly applied film. The solid film of silicone rubber is a photosensitive film. A solution formed by dissolving a photosensitive silicone rubber material is applied onto the protection film 14 of the substrate 2. The application method is not particularly limited, provided that the solution is applied uniformly in a predetermined amount. In this embodiment, for example, the solution is applied using a spin coater. Next, the solution is dried to eliminate the solvent.

Next, the solid film of silicone rubber is masked with a predetermined pattern and then exposed to light. The mask pattern is the same as the pattern in which the groove 18 is formed. Also, the solid film of silicone rubber is patterned by etching. As a result, the reverberation reduction film 15 of silicone rubber is placed on the protection film 14. As a method for placing the reverberation reduction film 15, precision screen printing may be used. This process completes the ultrasonic element 4. Moreover, the external terminal 3, the signal wiring 5, and the first common wiring 6 are formed on the substrate 2, thus completing the ultrasonic device 1. The external terminal 3, the signal wiring 5, and the first common wiring 6 are formed by forming a metal film, placing a mask film, patterning the mask film, etching the mask film, etching the metal film, and removing the mask film, in this order. This completes the ultrasonic device 1 shown in FIG. 1.

As described above, the embodiment has the following effects.

(1) In the embodiment, the ultrasonic device 1 has the substrate 2. The ultrasonic elements 4 are arrayed on the substrate 2. Each ultrasonic element 4 transmits the ultrasonic wave 12 into the first direction 13. The reverberation reduction film 15 is arranged on the side into the first direction 13 in the ultrasonic element 4. The reverberation reduction film 15 reduces reverberant vibration of the substrate 2. The presence of the reverberation reduction film 15 enables the ultrasonic element 4 to transmit the ultrasonic wave 12 highly responsively. In the reverberation reduction film 15, the groove 18 is arranged between the ultrasonic elements 4 next to each other.

A part of the ultrasonic wave 12 transmitted from the ultrasonic element 4 travels into a direction intersecting the first direction 13. This part of the ultrasonic wave 12 then travels through the reverberation reduction film 15 and reaches the groove 18. Air is present in the groove 18. The propagation speed of the ultrasonic wave 12 differs between the reverberation reduction film 15 and the air. The ultrasonic wave 12 is reflected off the groove 18 and therefore does not easily reach the ultrasonic element 4 next to the ultrasonic element 4 transmitting the ultrasonic wave 12. Therefore, the ultrasonic element 4 is not easily influenced by the ultrasonic wave 12 transmitted from the next ultrasonic element 4. Thus, the ultrasonic device 1 can transmit the ultrasonic wave 12 with high quality even when the ultrasonic elements 4 are arrayed.

(2) In the embodiment, the material of the reverberation reduction film 15 includes silicone rubber. Since silicone rubber has a low Young's modulus, the reverberation reduction film 15 can reduce reverberant vibration without obstructing the movement of the substrate 2.

(3) In the embodiment, a part of the ultrasonic wave 12*a* received by the ultrasonic element 4 travels into a direction intersecting the first direction 13. This part of the ultrasonic wave 12*a* travels through the reverberation reduction film 15 and reaches the groove 18. Air is present in the groove 18. The propagation speed of the ultrasonic wave 12*a* differs between the reverberation reduction film 15 and the air. The ultrasonic wave 12*a* is reflected off the groove 18 and therefore does not easily reach the ultrasonic element 4 next to the ultrasonic element 4 receiving the ultrasonic wave 12*a*. Therefore, the ultrasonic element 4 is not easily influenced by the ultrasonic wave 12*a* received by the next ultrasonic element 4. Thus, the ultrasonic wave 12*a* can be received with high quality even when the ultrasonic elements 4 are arrayed.

Second Embodiment

Figure 16:
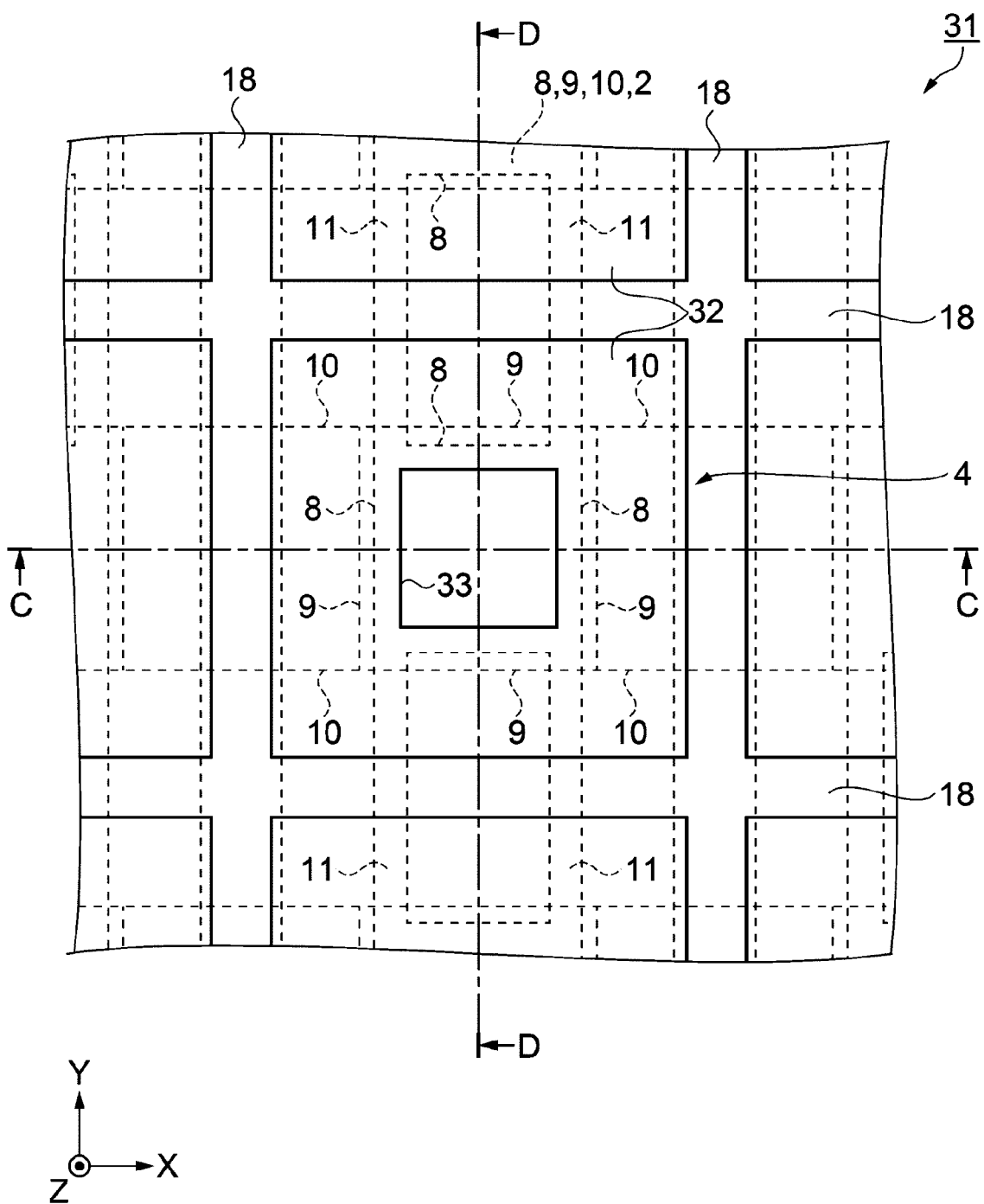
FIG. 16 is a schematic plan view showing an essential part of the configuration of an ultrasonic element according to a second embodiment.
Figure 17:
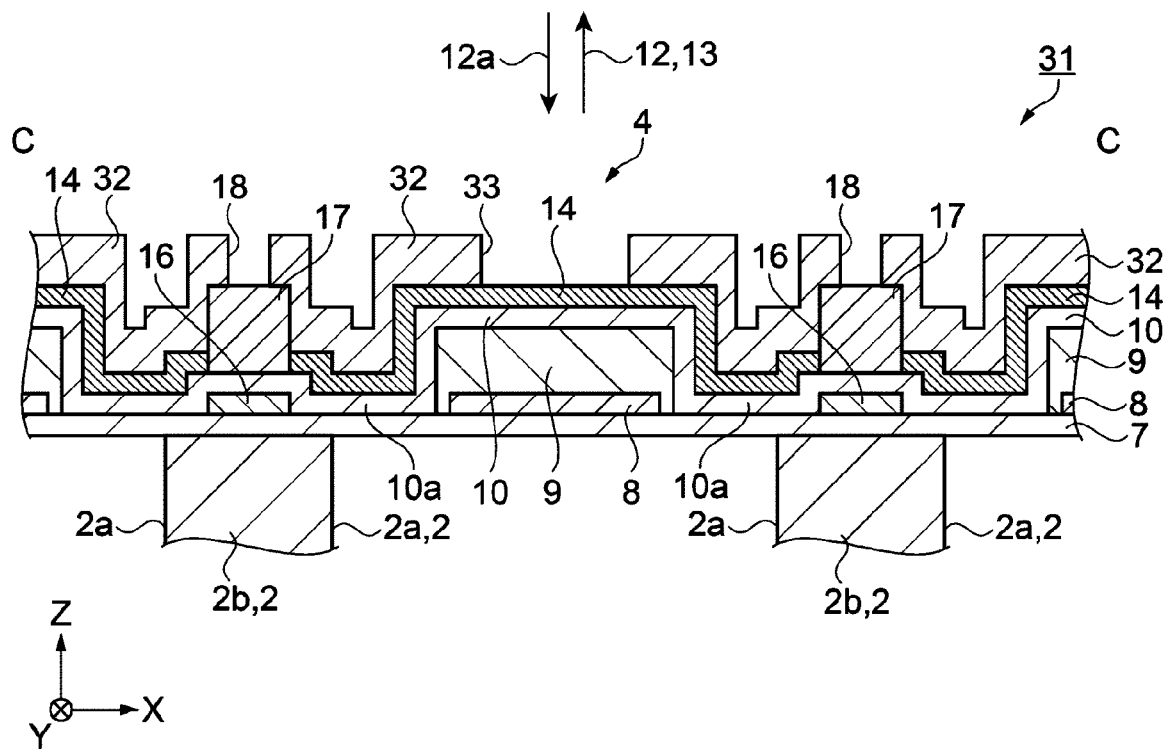
FIG. 17 is a schematic side cross-sectional view showing an essential part of the configuration of the ultrasonic element.
Figure 18:
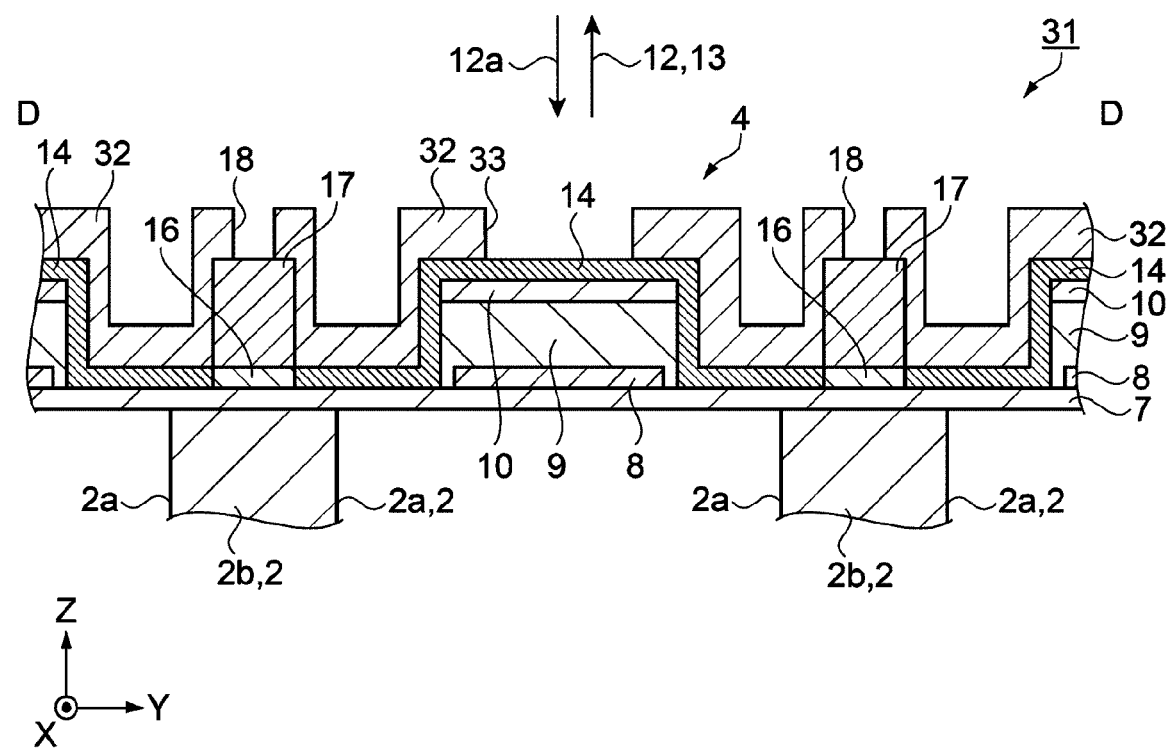
FIG. 18 is a schematic side cross-sectional view showing an essential part of the configuration of the ultrasonic element.

Another embodiment of the ultrasonic device 1 will now be described with reference to FIGS. 16 to 21. This embodiment differs from the first embodiment in that a reverberation reduction film 32 has a recess at a position facing the ultrasonic element 4. The description about the same features as those in the first embodiment is omitted. FIG. 16 is a schematic plan view showing an essential part of the configuration of the ultrasonic element. FIGS. 17 and 18 are schematic side cross-sectional views showing an essential part of the configuration of the ultrasonic element. FIG. 17 shows a cross section taken along C-C in FIG. 16. FIG. 18 shows a cross section taken along D-D in FIG. 16.

That is, in this embodiment, an ultrasonic device 31 has the substrate 2, as shown in FIGS. 16, 17, and 18. On the substrate 2, the ultrasonic elements 4 are arranged in the form of a matrix. On the side in the first direction 13 in the ultrasonic element 4, a reverberation reduction film 32 which reduces reverberant vibration of the substrate 2 is arranged. The reverberation reduction film 32 is superimposed on the protection film 14. The reverberation reduction film 32 reduces reverberation of the vibration of the substrate 2 including the vibrating film 7 and of the ultrasonic element 4. The material of the reverberation reduction film 32 includes silicone rubber. Since silicone rubber has a low Young's modulus, the reverberation reduction film 32 can reduce reverberant vibration without obstructing the movement of the substrate 2 including the vibrating film 7 and of the ultrasonic element 4. In the reverberation reduction film 32, a recess 33 is arranged at a position facing the ultrasonic element 4. At the recess 33, the reverberation reduction film 32 is thinner or absent. Thus, since the ultrasonic wave 12 passes through the recess 33, a reduction in the sound pressure of the ultrasonic wave 12 by the reverberation reduction film 32 can be restrained.

Figure 19:
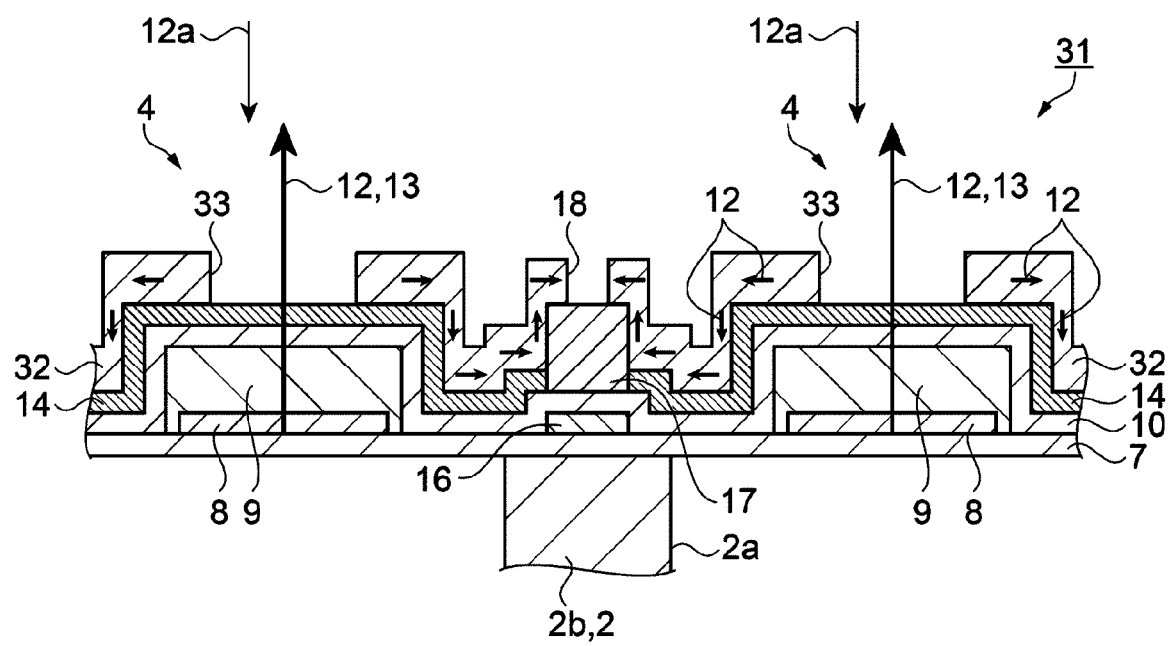
FIG. 19 is a schematic view for explaining an ultrasonic wave propagating through a reverberation reduction film.

FIG. 19 is a schematic view for explaining the ultrasonic wave propagating through the reverberation reduction film. As shown in FIG. 19, the ultrasonic wave 12 is transmitted into the first direction 13 from the ultrasonic element 4. A part of the ultrasonic wave 12 transmitted from the ultrasonic element 4 travels into a direction intersecting the first direction 13. When the reverberation reduction film 32 has the recess 33, apart of the ultrasonic wave 12 similarly propagates and travels through the reverberation reduction film 32. The ultrasonic wave 12 then reaches the groove 18. In the groove 18, air is present and therefore the refractive index is very different from that in the reverberation reduction film 32. That is, the propagation speed of the ultrasonic wave 12 differs between the reverberation reduction film 32 and the air.

Thus, a part of the ultrasonic wave 12 is reflected off the groove 18 and changes direction. A part of the ultrasonic wave 12 travels into the air from the reverberation reduction film 32 and travels in various directions in the air. Therefore, the ultrasonic wave 12 does not easily reach the ultrasonic element 4 next to the ultrasonic element 4 transmitting the ultrasonic wave 12. Accordingly, the ultrasonic element 4 is not easily influenced by the ultrasonic wave 12 transmitted from the next ultrasonic element 4. Thus, in the configuration where the reverberation reduction film 32 has the recess 33, the ultrasonic wave 12 can be transmitted with high quality even when the ultrasonic elements 4 are arrayed.

The illustration explains the behavior of the ultrasonic wave 12 traveling along the X-axis in the reverberation reduction film 32. Similarly, the ultrasonic wave 12 traveling along the Y-axis in the reverberation reduction film 32 does not easily reach the next ultrasonic element 4. Therefore, the ultrasonic element 4 is not easily influenced by the ultrasonic wave 12 transmitted from the next ultrasonic element 4, along the Y-axis, either.

Also, in the configuration where the reverberation reduction film 32 has the recess 33, when the ultrasonic element 4 receives the ultrasonic wave 12a, a part of the ultrasonic wave 12a reaching the reverberation reduction film 32 travels through the reverberation reduction film 32. At this time, a part of the ultrasonic wave 12a is reflected off the groove 18 and changes direction. A part of the ultrasonic wave 12a travels into the air from the reverberation reduction film 32 and travels in various directions in the air. Therefore, the ultrasonic wave 12a does not easily reach the ultrasonic element 4 next to the ultrasonic element 4 receiving the ultrasonic wave 12a. Accordingly, the ultrasonic element 4 is not easily influenced by the ultrasonic wave 12a received by the next ultrasonic element 4. Thus, in the configuration where the reverberation reduction film 32 has the recess 33, the ultrasonic wave 12a can be received with high quality even when the ultrasonic elements 4 are arrayed.

Figure 20:
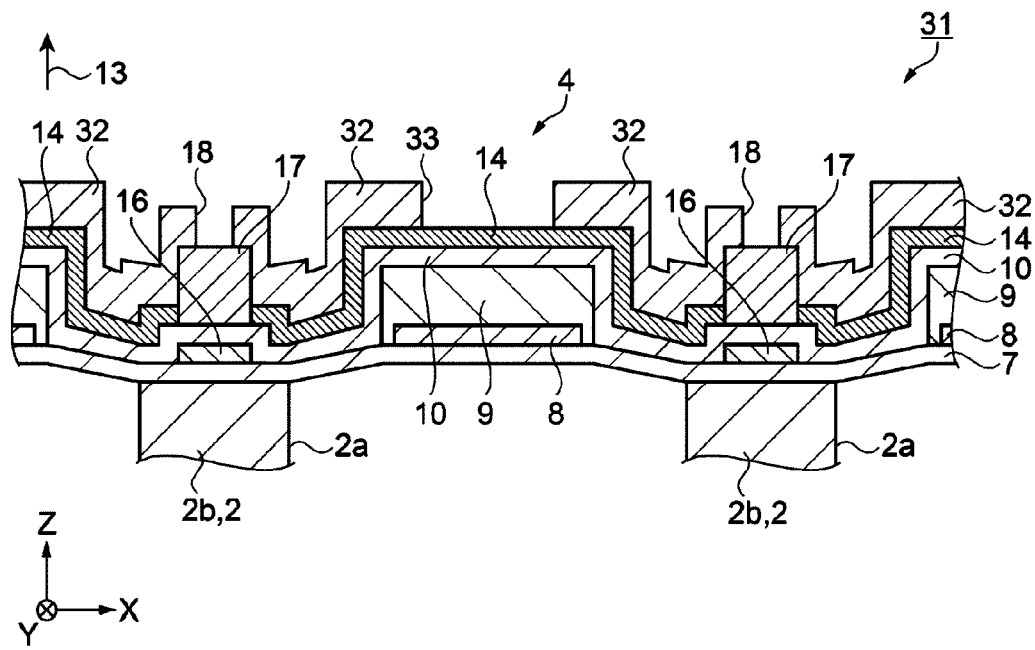
FIG. 20 is a schematic side cross-sectional view for explaining an operation of the ultrasonic element.
Figure 21:
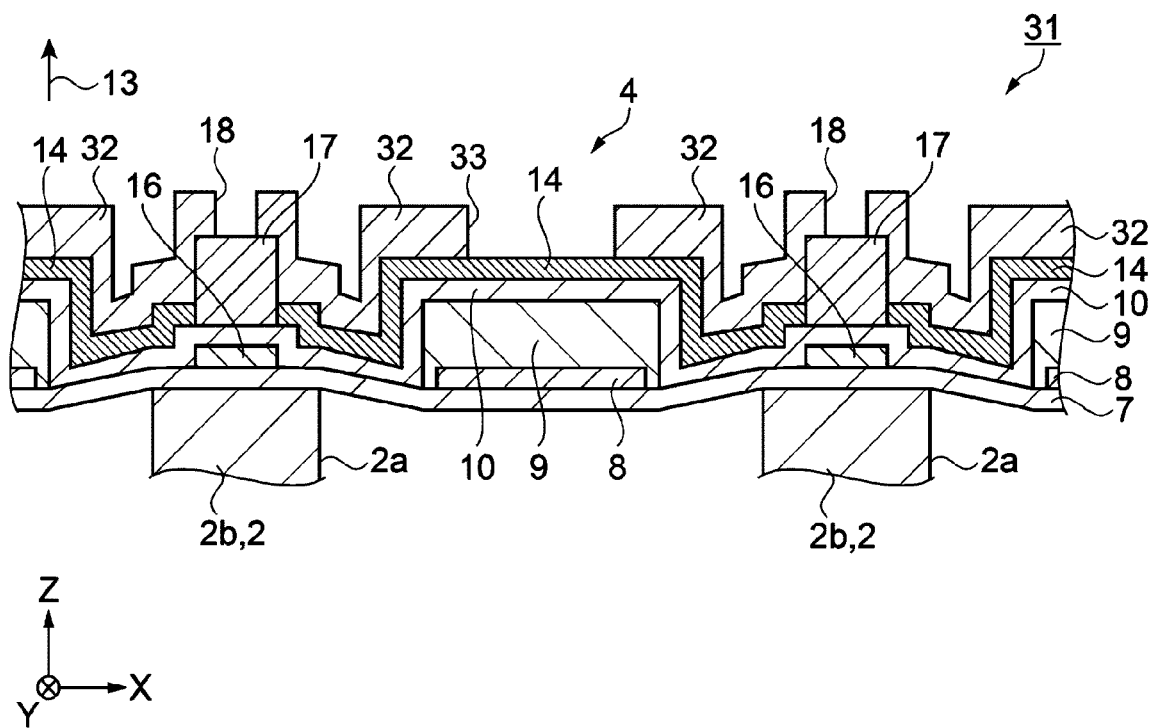
FIG. 21 is a schematic side cross-sectional view for explaining an operation of the ultrasonic element.

FIGS. 20 and 21 are schematic side cross-sectional views for explaining an operation of the ultrasonic element. FIG. 20 shows the state where the ultrasonic element 4 moves into the first direction 13. FIG. 21 shows the state where the ultrasonic element 4 moves into the direction opposite to the first direction 13. As shown in FIGS. 20 and 21, the vibrating film 7 flexes little at the position where the piezoelectric member 9 is located and the position where the beam 2b is located. The vibrating film 7 flexes largely between the position where the piezoelectric member 9 is located and the position where the beam 2b is located.

The reverberation reduction film 32 is arranged from the surface facing on the side in the first direction 13 of the piezoelectric member 9 to the surface facing on the side in the first direction 13 of the beam 2b. In this case, the reverberation reduction film 32 is securely arranged from the surface on the lateral side of the piezoelectric member 9 to the surface on the lateral side of the second common wiring 17. Therefore, the reverberation reduction film 32 is arranged over the range where the vibrating film 7 flexes largely. Thus, the reverberation reduction film 32 can securely reduce the reverberation of the vibrating film 7.

The illustration explains the structure on the X-axis side of the reverberation reduction film 32. The structure on the Y-axis side of the reverberation reduction film 32 is the same as the structure on the X-axis side. Therefore, on the Y-axis side, too, the reverberation reduction film 32 is arranged over the range where the vibrating film 7 flexes largely. Thus, the reverberation reduction film 32 can securely reduce the reverberation of the vibrating film 7.

When the ultrasonic element 4 receives the ultrasonic wave 12a, the vibrating film 7 similarly flexes. In this case, the reverberation reduction film 32 is arranged over the range where the vibrating film 7 flexes largely. Thus, the reverberation reduction film 32 can securely reduce the reverberation of the vibrating film 7.

As described above, this embodiment has the following effect.

(1) In this embodiment, the recess 33 is arranged in the reverberation reduction film 32 at the position facing the ultrasonic element 4. At the recess 33, the reverberation reduction film 32 is thinner or absent. Thus, the ultrasonic wave 12 passes through the recess 33 and therefore a reduction in the sound pressure of the ultrasonic wave 12 by the reverberation reduction film 32 can be restrained.

Third Embodiment

An embodiment of a scanner having the ultrasonic device 1 or the ultrasonic device 31 will now be described with reference to FIG. 22, which is a schematic side cross-sectional view showing the structure of the scanner. The description of the same features as in the first and second embodiments is omitted.

Figure 22:
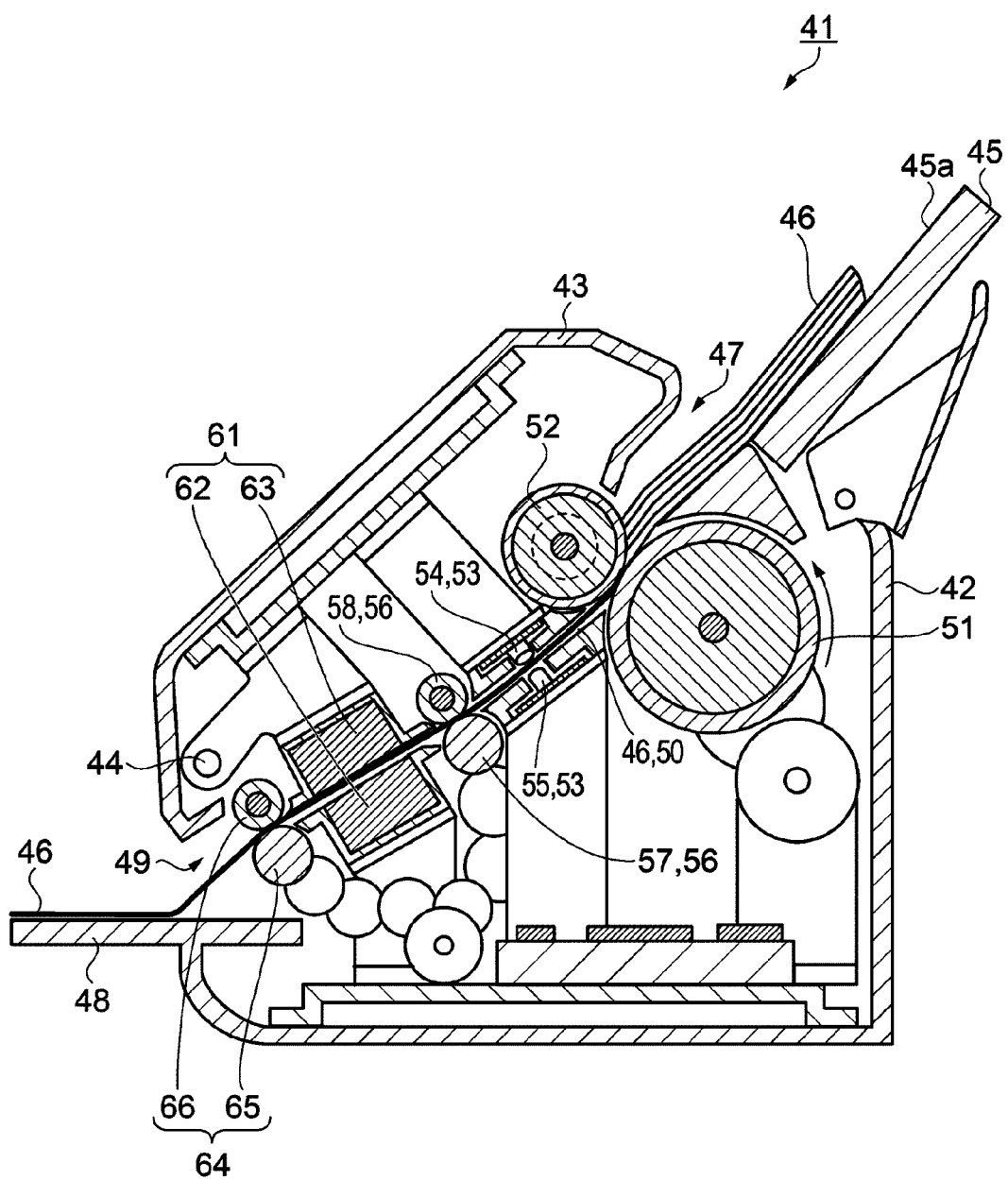
FIG. 22 is a schematic side cross-sectional view showing the structure of a scanner according to a third embodiment.

That is, in this embodiment, as shown in FIG. 22, a scanner 41 as an electronic apparatus is a device which reads an image drawn on a medium such as paper and is also referred to as an image reading device. The scanner 41 has a bottom case 42 and a top case 43. The bottom case 42 and the top case 43 are coupled together by a hinge 44 in such a way as to be able to open and close.

On the top right side of the bottom case 42 in the illustration, a cover 45 is attached in such a way as to be able to pivot about the bottom case 42. The surface on the side of the top case 43 of the cover 45 is a sheet placement surface 45a. On the sheet placement surface 45a, a plurality of sheets 46 are placed as media. The sheet 46 is quadrilateral. The plurality of sheets 46 are in the same shape. A feed opening 47 is arranged between the sheet placement surface 45a and the top case 43. The sheet 46 is fed into the scanner 41 from the feed opening 47.

The traveling direction of the sheet 46 is defined as a −Y direction. The width of the sheet 46 is along an X-axis. The sheets 46 are stacked along a Z-axis. The X-axis, the Y-axis, and the Z-axis are orthogonal to each other.

On the −Y side of the bottom case 42, a sheet discharge tray 48 is arranged. A discharge opening 49 is arranged in the bottom case 42 between the sheet discharge tray 48 and the top case 43. The sheet 46 enters the scanner 41 from the feed opening 47 and is discharged from the discharge opening 49. The sheet 46 discharged from the discharge opening 49 is stacked on the sheet discharge tray 48. The path through which the sheet 46 travels from the sheet placement surface 45a to the sheet discharge tray 48 is a transport path 50 of the sheet 46. In the transport path 50, the side of the cover 45 is upstream and the side of the sheet discharge tray 48 is downstream.

A feed roller 51 and a separation roller 52 are arranged downstream of the feed opening 47. The sheet 46 placed on the sheet placement surface 45a travels downward due to gravity acting on the sheet 46. Then, an edge of the sheet 46 comes into contact with the separation roller 52. When the feed roller 51 rotates counterclockwise in the illustration, the sheet 46 enters between the feed roller 51 and the separation roller 52.

When only one sheet 46 is nipped between the feed roller 51 and the separation roller 52, both the feed roller 51 and the separation roller 52 rotate to transport the sheet 46. When two sheets 46 are nipped between the feed roller 51 and the separation roller 52, the separation roller 52 rotates into a different direction from the feed roller 51 by a predetermined angle. When three or more sheets 46 are nipped between the feed roller 51 and the separation roller 52, the feed roller 51 may transport two or more sheets 46.

A multi-feed detection device 53 is installed downstream of the feed roller 51 and the separation roller 52 in the transport path 50 of the sheet 46. The multi-feed detection device 53 is a device which detects whether two or more sheets 46 are superimposed on each other or not. The multi-feed detection device 53 has an ultrasonic transmitter 54 and an ultrasonic receiver 55. The ultrasonic transmitter 54 transmits an ultrasonic wave 12. The ultrasonic receiver receives the ultrasonic wave 12 transmitted from the ultrasonic transmitter 54.

As the number of sheets 46 increases, the intensity of the ultrasonic wave 12 passing through the sheets 46 decreases. The multi-feed detection device 53 compares the intensity of the ultrasonic wave 12 received by the ultrasonic receiver 55 with a criterion value and thus detects whether the number of sheets 46 is one, or two or more. The multi-feed detection device 53 also has the ultrasonic device 1 or the ultrasonic device 31. The ultrasonic device 1 and the ultrasonic device 31 are devices that can transmit and receive the ultrasonic wave 12 with high quality even when the ultrasonic elements 4 are arrayed. Therefore, the scanner 41 can be regarded as an apparatus having the multi-feed detection device 53 in which the ultrasonic elements 4 transmitting and receiving the ultrasonic wave 12 with high quality even when arrayed are arranged.

A transport roller pair 56 is arranged downstream of the multi-feed detection device 53. The transport roller pair 56 has a transport drive roller 57 and a transport driven roller 58. The transport drive roller 57 and the transport driven roller 58 rotate, nipping the sheet 46 between them. The transport roller pair 56 transports the sheet 46 downstream.

An image reading device 61 is arranged downstream of the transport roller pair 56. The image reading device 61 has a lower reading unit 62 and an upper reading unit 63. The lower reading unit 62 reads an image provided on the surface on the −Z side of the sheet 46. The upper reading unit 63 reads an image provided on the surface on the +Z side of the sheet 46. In the lower reading unit 62 and the upper reading unit 63, for example, a contact image sensor module (CISM) is installed.

A discharge roller pair 64 is arranged downstream of the image reading device 61. The discharge roller pair 64 has a discharge drive roller 65 and a discharge driven roller 66. The discharge drive roller 65 and the discharge driven roller 66 rotate, nipping the sheet 46 between them. The discharge roller pair 64 transports the sheet 46 to the discharge opening 49.

As described above, this embodiment has the following effect.

(1) In this embodiment, the scanner 41 has the transport path 50. The multi-feed detection device 53 is installed in the transport path 50. The multi-feed detection device 53 detects whether two or more sheets 46 are superimposed on each other or not. The ultrasonic device 1 and the ultrasonic device 31 are used for the multi-feed detection device 53. The ultrasonic device 1 and the ultrasonic device 31 are devices that can transmit and receive the ultrasonic wave 12 with high quality even when the ultrasonic elements 4 are arrayed. Thus, the scanner 41 can be regarded as an apparatus having the multi-feed detection device 53 in which the ultrasonic elements 4 transmitting and receiving the ultrasonic wave 12 with high quality even when arrayed are arranged.

Fourth Embodiment

An embodiment of a printing device having the ultrasonic device 1 or the ultrasonic device 31 will now be described with reference to FIG. 23, which is a schematic side cross-sectional view showing the structure of the printing device. The description of the same features as in the first and second embodiment is omitted.

Figure 23:
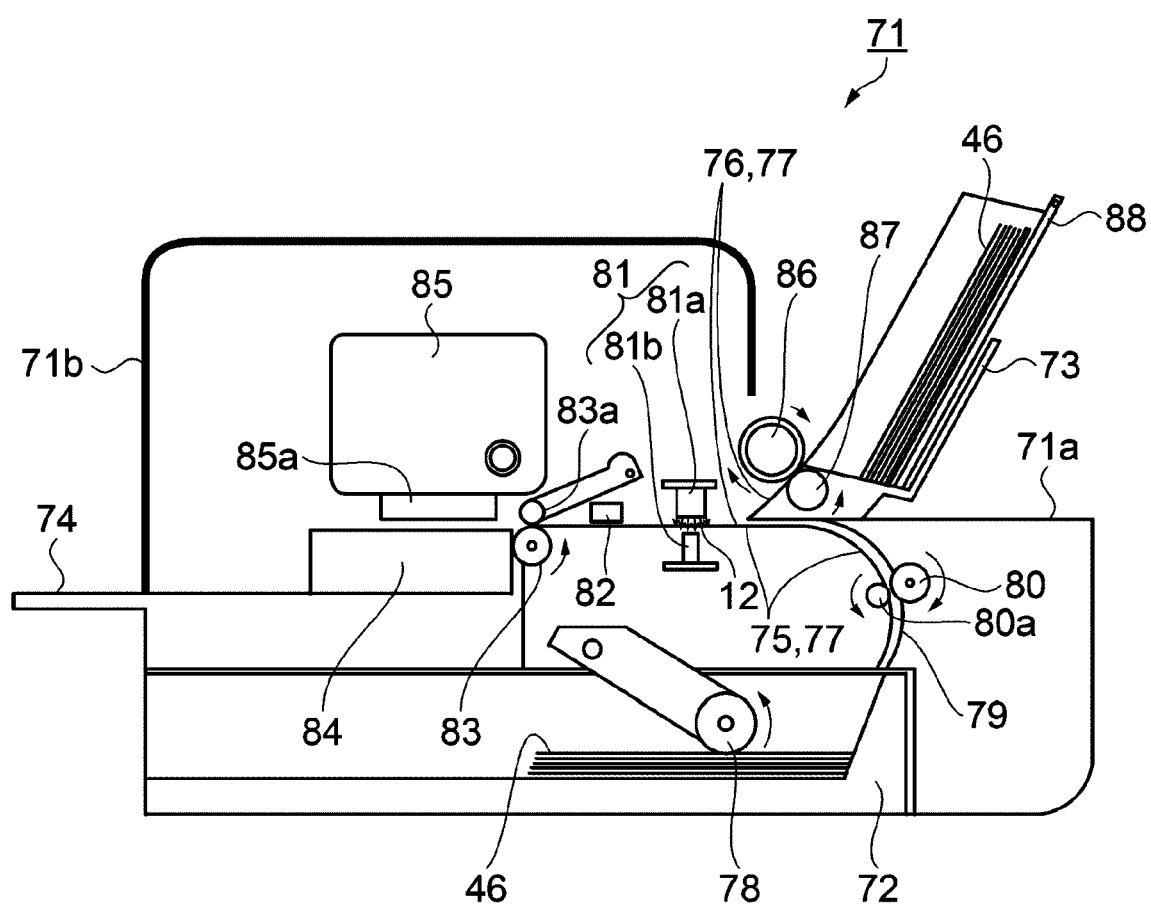
FIG. 23 is a schematic side cross-sectional view showing the structure of a printing device according to a fourth embodiment.

That is, in this embodiment, as shown in FIG. 23, a printer 71 as an electronic apparatus has a front feed tray 72 and a rear feed tray 73. The front feed tray 72 is installed substantially horizontally at a bottom part of the printer 71. The rear feed tray 73 is arranged at a rear part 71a of the printer 71 in such a way as to protrude to the upper right in the illustration. Various sheets 46 are placed on the front feed tray 72 and the rear feed tray 73.

The sheet 46 placed on the front feed tray 72 and the rear feed tray 73 is supplied to a predetermined transport path. The sheet 46 is then transported along the transport path and discharged onto a discharge tray 74 arranged on the side of a front part 71b of the printer 71. In the transport path, the front feed tray 72 and the rear feed tray 73 are upstream, and the side of the discharge tray 74 is downstream.

In the printer 71, there is a first transport path 75 of the sheet 46 whose upstream position is the front feed tray 72, and a second transport path 76 of the sheet 46 whose upstream position is the rear feed tray 73. The first transport path 75 and the second transport path 76 form a transport path 77.

First, the transport of the sheet 46 through the first transport path 75 will now be described. A pickup roller 78 is provided in such away that its outer circumference comes into contact with the uppermost sheet 46 of the sheets 46 placed on the front feed tray 72. The pickup roller 78 rotates counterclockwise in the illustration and sends out the sheet 46 in contact with its outer circumference, toward the rear part 71a.

The right-hand side end in the illustration of the sheet 46 is guided by a transport guide 79. A part of the transport guide 79 forms a transport path curved in a substantially semicircular shape. The sheet 46 is guided by the transport guide 79 and travels toward the discharge tray 74. The sheet 46 is curved along the transport guide 79 and guided upward in the illustration.

In the middle of the curved path of the transport guide 79, an intermediate roller 80 and an intermediate driven roller 80a are provided. The intermediate roller 80 and the intermediate driven roller 80a rotate, nipping the sheet 46 between them. The intermediate roller 80 rotates clockwise in the illustration. The rotational driving of the intermediate roller 80 causes the sheet 46 to be transported further along the transport guide 79.

In the first transport path 75 of the sheet 46, a multi-feed detection device 81 is installed downstream of the transport guide 79. The multi-feed detection device 81 detects whether two or more sheets 46 are superimposed on each other or not. The multi-feed detection device 81 has an ultrasonic transmitter 81a and an ultrasonic receiver 81b. The ultrasonic receiver 81b receives the ultrasonic wave 12 transmitted from the ultrasonic transmitter 81a. The multi-feed detection device 81 has the ultrasonic device 1 or the ultrasonic device 31. The ultrasonic device 1 and the ultrasonic device 31 are devices that can transmit and receive the ultrasonic wave 12 with high quality even when the ultrasonic elements 4 are arrayed. Therefore, the printer 71 can be regarded as an apparatus having the multi-feed detection device 81 in which the ultrasonic elements 4 transmitting and receiving the ultrasonic wave 12 with high quality even when arrayed are arranged.

In the first transport path 75, a sheet edge sensor 82 is arranged downstream of the multi-feed detection device 81. The sheet edge sensor 82 has a light emitting unit and alight receiving unit, not illustrated. The sheet edge sensor 82 determines whether the sheet 46 blocks an optical path between the light emitting unit and the light receiving unit or not, and thus detects the front edge of a sheet.

In the first transport path 75, a transport roller 83 and a transport driven roller 83a are arranged downstream of the sheet edge sensor 82. The transport roller 83 and the transport driven roller 83a transport the sheet 46 downstream, nipping the sheet 46 between them.

In the first transport path 75, a platen 84 and a carriage 85 are arranged downstream of the transport roller 83. The platen 84 supports the transported sheet 46 from below in the illustration. The carriage 85 is located above the platen 84 in the illustration, with the sheet 46 located between them. The carriage 85 has a print head 85a on its lower side in the illustration. On the lower surface in the illustration of the print head 85a, a number of nozzles are arrayed and placed. Ink is ejected from each nozzle. The carriage 85 moves along an axis perpendicular to the face of the illustration. The movement of the carriage 85 along this axis is referred to as main scanning. While the carriage 85 performs main scanning, the print head 85a ejects ink onto the sheet 46. The print head 85a can draw a raster line along the main scanning axis, in an area facing the nozzles.

Transporting the sheet 46 after main scanning can shift the print position on the sheet 46. Transporting the sheet 46 for drawing is referred to as sub scanning. Sub scanning of the sheet 46 allows a raster line to be drawn at a different position on the sheet 46. The printer 71 repeatedly executes main scanning and sub scanning and thus forms a print image on the sheet 46. The sheet 46 with the print image formed thereon is discharged onto the discharge tray 74.

Next, the transport of the sheet 46 through the second transport path 76 will be described. A hopper 88 is installed on the rear feed tray 73. In the second transport path 76, a load roller 86 and a load driven roller 87 are arranged downstream of the hopper 88.

The hopper 88 moves back and forth in a direction in which the downstream part of the rear feed tray 73 approaches the load roller 86 and in a direction in which this downstream part moves away from the load roller 86. When the hopper 88 approaches the load roller 86, the front edge of the uppermost sheet 46 on the rear feed tray 73 hits the load roller 86 and the sheet 46 is then nipped between the hopper 88 and the load roller 86. When the load roller 86 is rotated in this state, the sheet 46 is nipped between the load roller 86 and the load driven roller 87 and transported downstream.

The sheet 46 transported by the rotation of the load roller 86 passes through the multi-feed detection device 81. The multi-feed detection device 81 is installed in the second transport path 76 of the sheet 46 and detects whether two or more sheets 46 are superimposed on each other or not.

The front edge of the sheet 46 reaches the sheet edge sensor 82. Then, the front edge of the sheet 46 transported further toward the front part 71b by the rotation of the load roller 86 passes by the sheet edge sensor 82 and reaches the transport roller 83. The sheet 46 is transported onto the platen 84 by the transport roller 83. Then, the main scanning of the carriage 85 and the sub scanning of the sheet 46 are repeatedly carried out to form a print image. The path through which the sheet 46 is transported from the rear feed tray 73 to the discharge tray 74 is the second transport path 76. The first transport path 75 and the second transport path 76 form the transport path 77.

As described above, this embodiment has the following effect.

(1) In this embodiment, the printer 71 has the transport path 77. The multi-feed detection device 81 is installed in the transport path 77. The multi-feed detection device 81 detects whether two or more sheets 46 are superimposed on each other or not. The ultrasonic device 1 and the ultrasonic device 31 are used for the multi-feed detection device 81. The ultrasonic device 1 and the ultrasonic device 31 are devices that can transmit and receive the ultrasonic wave 12 with high quality even when the ultrasonic elements 4 are arrayed. Thus, the printer 71 can be regarded as an apparatus having the multi-feed detection device 81 in which the ultrasonic elements 4 transmitting and receiving the ultrasonic wave 12 with high quality even when arrayed are arranged.

Fifth Embodiment

An embodiment of a distance measuring device having the ultrasonic device 1 or the ultrasonic device 31 will now be described with reference to FIG. 24, which is a block diagram showing the configuration of the distance measuring device. The description of the same features as in the first and second embodiments is omitted.

Figure 24:
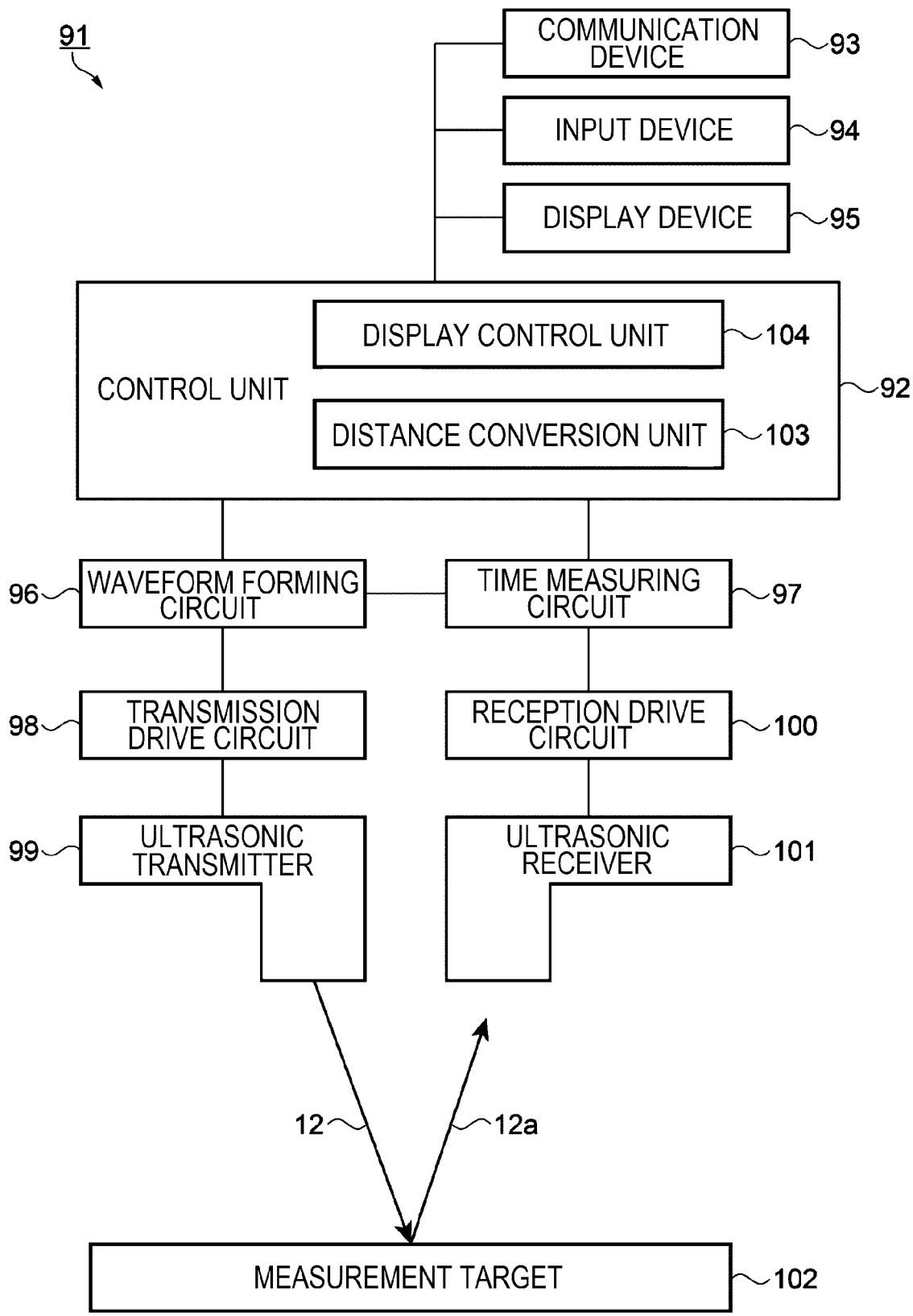
FIG. 24 is a block diagram showing the configuration of a distance measuring device according to a fifth embodiment.

That is, in this embodiment, as shown in FIG. 24, a distance measuring device 91 as an electronic apparatus has a control unit 92. The control unit 92 has a CPU (central processing unit) and a memory. A program and various data are stored in the memory. The control unit 92 operates according to the program. A communication device 93, an input device 94, and a display device 95 are coupled to the control unit 92.

The communication device 93 is coupled to an external device and inputs a signal outputted from the external device. The control unit 92 operates according to the inputted signal. The communication device 93 also outputs a measurement result to the external device. The input device 94 is a device made up of various switches or the like and inputting an instruction by an operator. The control unit 92 takes in a signal inputted from the input device 94 and operates according to the inputted signal. The display device 95 displays a measurement condition and a measurement result. For example, a liquid crystal display device is used as the display device 95.

Also, a waveform forming circuit 96 and a time measuring circuit 97 are coupled to the control unit 92. The waveform forming circuit 96 is coupled to a transmission drive circuit 98 and the time measuring circuit 97. An ultrasonic transmitter 99 is coupled to the transmission drive circuit 98. The time measuring circuit 97 is coupled to a reception drive circuit 100. The reception drive circuit 100 is coupled to an ultrasonic receiver 101.

The waveform forming circuit 96 is a circuit which forms a drive waveform to drive the ultrasonic transmitter 99. The drive waveform is not particularly limited. However, in this embodiment, for example, the drive waveform formed by the waveform forming circuit 96 is a burst waveform having a rectangular wave of 600 kHz. The transmission drive circuit 98 amplifies the drive waveform. The ultrasonic transmitter 99 takes in the amplified drive waveform and transmits the ultrasonic wave 12 toward a measurement target 102. The ultrasonic wave 12 transmitted from the ultrasonic transmitter 99 is reflected off the measurement target 102. Apart of the reflected ultrasonic wave 12a travels toward the ultrasonic receiver 101. The ultrasonic receiver 101 receives the ultrasonic wave 12a transmitted from the ultrasonic transmitter 99.

The ultrasonic receiver 101 receives the ultrasonic wave 12a and outputs a voltage signal corresponding to the ultrasonic wave 12a, to the reception drive circuit 100. The voltage signal corresponding to the ultrasonic wave 12a is referred to as an ultrasonic signal. The reception drive circuit 100 takes in and amplifies the ultrasonic signal and outputs the amplified ultrasonic signal to the time measuring circuit 97. The time measuring circuit 97 measures the time from when the waveform forming circuit 96 outputs the drive waveform to when the ultrasonic signal is inputted. The time measuring circuit 97 outputs a measurement value of the measured time to the control unit 92.

In the control unit 92, the CPU controls the operation of the distance measuring device 91 according to the program stored in the memory. The control unit 92 has various functional units to implement functions. The control unit 92 has a distance conversion unit 103 and a display control unit 104, as specific functional units. The distance conversion unit 103 takes in the measurement value of the time from the time measuring circuit 97. The distance conversion unit 103 then multiplies the measurement value of the time by the velocity of the ultrasonic wave 12. The distance conversion unit 103 then calculates a distance travelled, which is the distance taken by the ultrasonic wave 12 to reach the ultrasonic receiver 101 from the ultrasonic transmitter 99 via the measurement target 102. The distance conversion unit 103 also divides the distance travelled by 2 and thus calculates a separation distance, which is the distance from the ultrasonic transmitter 99 and the ultrasonic receiver 101 to the measurement target 102.

The display control unit 104 causes the display device 95 to display the value of the separation distance. The display control unit 104 also causes the communication device 93 to output the value of the separation distance to the external device. The ultrasonic transmitter 99 and the ultrasonic receiver 101 have the ultrasonic device 1 or the ultrasonic device 31. The ultrasonic device 1 and the ultrasonic device 31 are devices that can transmit and receive the ultrasonic wave 12 with high quality even when the ultrasonic elements 4 are arrayed. Thus, the distance measuring device 91 can be regarded as an apparatus having the ultrasonic device 1 or the ultrasonic device 31 in which the ultrasonic elements 4 transmitting and receiving the ultrasonic wave 12 with high quality even when arrayed are arranged.

The disclosure is not limited to the foregoing embodiments. A person with ordinary skills in the art can add various changes and improvements within the technical idea of the disclosure. Modifications will be described below.

Modification 1

In the fifth embodiment, the ultrasonic transmitter 99 and the ultrasonic receiver 101 have the ultrasonic device or the ultrasonic device 31. One of the ultrasonic transmitter 99 and the ultrasonic receiver 101 may have the ultrasonic device 1 or the ultrasonic device 31. When the ultrasonic transmitter 99 has the ultrasonic device 1 or the ultrasonic device 31, the ultrasonic transmitter 99 is not susceptible to damage and can transmit the ultrasonic wave 12 with high performance. When the ultrasonic receiver 101 has the ultrasonic device 1 or the ultrasonic device 31, the ultrasonic receiver 101 is not susceptible to damage and can receive the ultrasonic wave 12a with high performance. This matter can also be applied to the third and fourth embodiment.

Modification 2

In the fifth embodiment, the example of the distance measuring device 91 having the ultrasonic device 1 or the ultrasonic device 31 is described. Also, the ultrasonic device 1 or the ultrasonic device 31 may be used for a proximity sensor which detects whether there is an object nearby or not. In this case, too, the proximity sensor can detect an object with high quality.

The contents derived from the embodiments are described below.

An ultrasonic device has a substrate in which ultrasonic elements transmitting an ultrasonic wave in a first direction are arrayed. A reverberation reduction film which reduces reverberant vibration of the substrate is arranged on a side of the first direction in the ultrasonic element. In the reverberation reduction film, a groove is arranged between the ultrasonic elements next to each other.

In this configuration, the ultrasonic device has the substrate. The ultrasonic elements are arrayed on the substrate. Each ultrasonic element transmits the ultrasonic wave into the first direction. The reverberation reduction film is arranged on the side into the first direction in the ultrasonic element. The reverberation reduction film reduces reverberant vibration of the substrate. The presence of the reverberation reduction film enables the ultrasonic element to transmit the ultrasonic wave highly responsively. In the reverberation reduction film, the groove is arranged between the ultrasonic elements next to each other.

A part of the ultrasonic wave transmitted from the ultrasonic element travels into a direction intersecting the first direction. This part of the ultrasonic wave then travels through the reverberation reduction film and reaches the groove. Air is present in the groove. The propagation speed of the ultrasonic wave differs between the reverberation reduction film and the air. The ultrasonic wave is reflected off the groove and therefore does not easily reach the ultrasonic element next to the ultrasonic element transmitting the ultrasonic wave. Therefore, the ultrasonic element is not easily influenced by the ultrasonic wave transmitted from the next ultrasonic element. Thus, the ultrasonic elements can transmit the ultrasonic wave with high quality even when arrayed.

In the ultrasonic device, a material of the reverberation reduction film may include silicone rubber.

In this configuration, the material of the reverberation reduction film includes silicone rubber. Since silicone rubber has a low Young's modulus, the reverberation reduction film can reduce reverberant vibration without obstructing the movement of the substrate.

In the ultrasonic device, a recess may be arranged in the reverberation reduction film at a position facing the ultrasonic element.

In this configuration, the recess is arranged in the reverberation reduction film at the position facing the ultrasonic element. At the recess, the reverberation reduction film is thinner or absent. Thus, the ultrasonic wave passes through the recess and therefore a reduction in the sound pressure of the ultrasonic wave by the reverberation reduction film can be restrained.

An electronic apparatus has a multi-feed detection device which is installed in a transport path of a medium and which detects whether two or more of the media are superimposed on each other or not. The multi-feed detection device has the foregoing ultrasonic device.

In this configuration, the electronic apparatus has the transport path. The multi-feed detection device is installed in the transport path. The multi-feed detection device detects whether two or more sheets are superimposed on each other or not. The foregoing ultrasonic device is used for the multi-feed detection device. The ultrasonic device is a device that can transmit and receive the ultrasonic wave with high quality even when the ultrasonic elements are arrayed.

Thus, the electronic apparatus can be regarded as an apparatus having the multi-feed detection device in which the ultrasonic elements transmitting and receiving the ultrasonic wave with high quality even when arrayed are arranged.

An electronic apparatus has an ultrasonic transmitter which transmits an ultrasonic wave, and an ultrasonic receiver which receives the ultrasonic wave transmitted from the ultrasonic transmitter. The ultrasonic transmitter has the foregoing ultrasonic device.

In this configuration, the electronic apparatus has the ultrasonic transmitter and the ultrasonic receiver. The foregoing ultrasonic device is used for the ultrasonic transmitter. The ultrasonic device is a device that can transmit and receive the ultrasonic wave with high quality even when the ultrasonic elements are arrayed. Thus, the electronic apparatus can be regarded as an apparatus having the ultrasonic device in which the ultrasonic elements transmitting the ultrasonic wave with high quality even when arrayed are arranged.

An ultrasonic device has a substrate in which ultrasonic elements receiving an ultrasonic wave traveling from a first direction are arrayed. A reverberation reduction film which reduces reverberant vibration of the substrate is arranged on a side of the first direction in the ultrasonic element. In the reverberation reduction film, a groove is arranged between the ultrasonic elements next to each other.

In this configuration, apart of the ultrasonic wave received by the ultrasonic element travels in a direction intersecting the first direction. This part of the ultrasonic wave travels through the reverberation reduction film and reaches the groove. Air is present in the groove. The propagation speed of the ultrasonic wave differs between the reverberation reduction film and the air. The ultrasonic wave is reflected off the groove and therefore does not easily reach the ultrasonic element next to the ultrasonic element receiving the ultrasonic wave. Therefore, the ultrasonic element is not easily influenced by the ultrasonic wave received by the next ultrasonic element. Thus, the ultrasonic elements can receive the ultrasonic wave with high quality even when arrayed.

What is claimed is:

1. An ultrasonic device comprising:
   a substrate on which a plurality of ultrasonic elements are arrayed, the plurality of ultrasonic elements being spaced apart from each other by a predetermined distance, each of the plurality of ultrasonic elements transmitting an ultrasonic wave in a first direction;
   a reverberation reduction film that covers the plurality of ultrasonic elements on the substrate, the reverberation reduction film being configured to reduce a reverberant vibration of the substrate when the plurality of ultrasonic elements transmit the ultrasonic waves; and
   a groove that is formed in the reverberation reduction film at a position aligned with the space between two adjacent ultrasonic elements of the plurality of ultrasonic elements,
   wherein the reverberation reduction film respectively continuously extends from tops of the two adjacent ultrasonic elements of the plurality of ultrasonic elements toward the groove.

2. The ultrasonic device according to claim 1, wherein a material of the reverberation reduction film includes silicone rubber.

3. The ultrasonic device according to claim 1, wherein a recess is arranged in the reverberation reduction film at a position facing one of the plurality of ultrasonic elements.

4. An electronic apparatus comprising:
   a multi-feed detection device which is installed in a transport path of a medium and which is configured to detect whether two or more of the medium are superimposed on each other or not, the multi-feed detection device having an ultrasonic device, the ultrasonic device being configured with:
   a substrate on which a plurality of ultrasonic elements are arrayed, the plurality of ultrasonic elements being spaced apart from each other by a predetermined distance, each of the plurality of ultrasonic elements transmitting an ultrasonic wave in a first direction;
   a reverberation reduction film that covers the plurality of ultrasonic elements on the substrate, the reverberation reduction film being configured to reduce a reverberant vibration of the substrate when the plurality of ultrasonic elements transmit the ultrasonic waves; and
   a groove that is formed in the reverberation reduction film at a position aligned with the space between two adjacent ultrasonic elements of the plurality of ultrasonic elements,
   wherein the reverberation reduction film respectively continuously extends from tops of the two adjacent ultrasonic elements of the plurality of ultrasonic elements toward the groove.

5. The ultrasonic device according to claim 1, further comprising:
   an ultrasonic receiver configured to receive the ultrasonic wave transmitted from the plurality of ultrasonic elements.

6. An ultrasonic device comprising:
   a substrate on which a plurality of ultrasonic elements are arrayed, the plurality of ultrasonic elements being spaced apart from each other by a predetermined distance, each of the plurality of ultrasonic elements receiving an ultrasonic wave traveling along a first direction;
   a reverberation reduction film that covers the plurality of ultrasonic elements on the substrate, the reverberation reduction film being configured to reduce a reverberant vibration of the substrate when the plurality of ultrasonic elements receive the ultrasonic waves; and
   a groove that is formed in the reverberation reduction film at a position aligned with the space between two adjacent ultrasonic elements of the plurality of ultrasonic elements,
   wherein the reverberation reduction film respectively continuously extends from tops of the two adjacent ultrasonic elements of the plurality of ultrasonic elements toward the groove.

* * * * *